US012609403B2

(12) United States Patent
Wrobel et al.

(10) Patent No.: US 12,609,403 B2
(45) Date of Patent: *Apr. 21, 2026

(54) POWER TOOL WITH BATTERY PACK ENCLOSURE

(71) Applicants: BLACK & DECKER INC., New Britain, CT (US); Graco Inc., Minneapolis, MN (US)

(72) Inventors: Steven Jay Wrobel, Rogers, MN (US); Diane Leigh Olson, Elk River, MN (US); David John Thompson, Oak Grove, MN (US); David Keith Esslinger, Timonium, MD (US); Michael Varipatis, Fallston, MD (US)

(73) Assignees: Black & Decker Inc., New Britain, CT (US); Graco Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,557

(22) Filed: Dec. 22, 2023

(65) Prior Publication Data

US 2024/0136644 A1 Apr. 25, 2024

Related U.S. Application Data

(63) Continuation of application No. 17/325,386, filed on May 20, 2021, now Pat. No. 11,894,572.

(Continued)

(51) Int. Cl.
| | |
|---|---|
| *B25F 5/02* | (2006.01) |
| *H01M 50/247* | (2021.01) |
| *H01M 50/296* | (2021.01) |

(52) U.S. Cl.
CPC ............. *H01M 50/296* (2021.01); *B25F 5/02* (2013.01); *H01M 50/247* (2021.01)

(58) Field of Classification Search
CPC ........... H01M 50/296; H01M 2220/30; H01M 50/244; H01M 50/247; Y02E 60/10; B25F 5/02
See application file for complete search history.

(56) References Cited

U.S. PATENT DOCUMENTS

| | | | | |
|---|---|---|---|---|
| 4,930,583 A | | 6/1990 | Fushiya et al. | |
| 5,725,304 A | * | 3/1998 | Inai ........................... | H02K 9/26 |
| | | | | 366/120 |

(Continued)

FOREIGN PATENT DOCUMENTS

| | | |
|---|---|---|
| CN | 204076206 U | 1/2015 |
| CN | 105313080 A | 2/2016 |

(Continued)

OTHER PUBLICATIONS

International Search Report and Written Opinion, PCT Application No. PCT/US2021/033472, Oct. 15, 2021, 13 pages, EPO.

(Continued)

*Primary Examiner* — Elim Ortiz
(74) *Attorney, Agent, or Firm* — Brake Hughes Bellermann LLP

(57) ABSTRACT

A power tool battery pack enclosure is configured to be coupled to battery pack receptacles of a plurality of power tools, each battery pack receptacle configured to removably receive a plurality of power tool battery packs. The enclosure includes a first clamshell member and a second clamshell member configured to be coupled around at least a portion of an exterior surface of each battery pack receptacle. Each of the first and second clamshell members have a top wall portion configured to be received over the exterior surface of the battery pack receptacle and a sidewall portion that extends downward from the top wall portion over at least a portion of the battery pack housing when the battery pack is received in the battery pack receptacle. The first and (Continued)

second enclosure members cover at least a portion of the battery back receptacle and at least a portion of the portion of a battery pack housing while allowing the battery pack to be removed from the battery pack receptacle while the enclosure remains coupled to the battery pack receptacle.

19 Claims, 21 Drawing Sheets

Related U.S. Application Data

(60) Provisional application No. 63/028,622, filed on May 22, 2020.

(56) References Cited

U.S. PATENT DOCUMENTS

| | | | |
|---|---|---|---|
| 5,941,385 A * | 8/1999 | Barton ................... | B65D 21/08 |
| | | | 206/370 |
| 7,766,097 B2 | 8/2010 | Kondo | |
| 8,573,322 B2 | 11/2013 | Nagasaka et al. | |
| 8,733,471 B2 | 5/2014 | Nagasaka et al. | |
| 9,034,505 B2 | 5/2015 | Detry et al. | |
| 9,254,032 B2 | 2/2016 | Moreau et al. | |
| 9,452,513 B1 | 9/2016 | Kravitch | |
| 9,687,253 B2 | 6/2017 | Detry et al. | |
| 9,957,744 B2 | 5/2018 | Hamman et al. | |
| 10,625,909 B2 | 4/2020 | Aman | |
| 11,325,180 B2 | 5/2022 | Yabunaka et al. | |
| 2003/0090234 A1 | 5/2003 | Glasgow et al. | |
| 2007/0245575 A1 | 10/2007 | Rosskamp | |
| 2010/0218967 A1 | 9/2010 | Roßkamp et al. | |
| 2010/0269649 A1 | 10/2010 | Rantz | |
| 2012/0067914 A1 * | 3/2012 | Sadler ................... | H01M 50/24 |
| | | | 220/810 |
| 2012/0321912 A1 | 12/2012 | Hachisuka et al. | |
| 2013/0196203 A1 * | 8/2013 | Wackwitz ......... | H01M 10/0525 |
| | | | 429/96 |
| 2015/0090749 A1 | 4/2015 | Moreau et al. | |

| | | | |
|---|---|---|---|
| 2015/0165534 A1 | 6/2015 | Hamm | |
| 2016/0192989 A1 | 7/2016 | Aman | |
| 2016/0214265 A1 | 7/2016 | Thorson et al. | |
| 2016/0348879 A1 | 12/2016 | Young et al. | |
| 2018/0147713 A1 | 5/2018 | Schmauder et al. | |
| 2019/0140228 A1 | 5/2019 | Handley et al. | |
| 2019/0175220 A1 | 6/2019 | Coppedge et al. | |
| 2020/0121390 A9 | 4/2020 | Aman | |
| 2020/0215679 A1 | 7/2020 | Tamura et al. | |
| 2020/0306848 A1 | 10/2020 | Preus et al. | |
| 2020/0340634 A1 | 10/2020 | Puzio et al. | |
| 2021/0283758 A1 | 9/2021 | Furusawa et al. | |
| 2021/0367305 A1 | 11/2021 | Wrobel et al. | |
| 2021/0394254 A1 | 12/2021 | Yabunaka et al. | |
| 2022/0021065 A1 | 1/2022 | Yueda | |

FOREIGN PATENT DOCUMENTS

| | | | | |
|---|---|---|---|---|
| CN | 211957718 U | 11/2020 | | |
| CN | 114055409 A * | 2/2022 | ............... | B25F 5/02 |
| DE | 4231975 A1 | 4/1993 | | |
| DE | 102017204700 A1 | 9/2018 | | |
| EP | 3085499 A1 | 10/2016 | | |
| EP | 3321039 A1 | 5/2018 | | |
| JP | 2009262296 A | 11/2009 | | |
| JP | 5002079 B1 | 8/2012 | | |
| JP | 7043314 B2 * | 3/2022 | | |
| JP | 7109281 B2 | 7/2022 | | |
| JP | 2022131100 A | 9/2022 | | |
| WO | WO-2014038359 A1 * | 3/2014 | ......... | H01M 50/271 |
| WO | 2015066759 A1 | 5/2015 | | |
| WO | 2016002293 A1 | 1/2016 | | |
| WO | 2017102673 A1 | 6/2017 | | |
| WO | 2021090605 A1 | 5/2021 | | |
| WO | 2021236968 A1 | 11/2021 | | |

OTHER PUBLICATIONS

International Preliminary Report on Patentability, PCT Application No. PCT/US2021/033472, Dec. 1, 2022, 8 pages, WIPO.

* cited by examiner

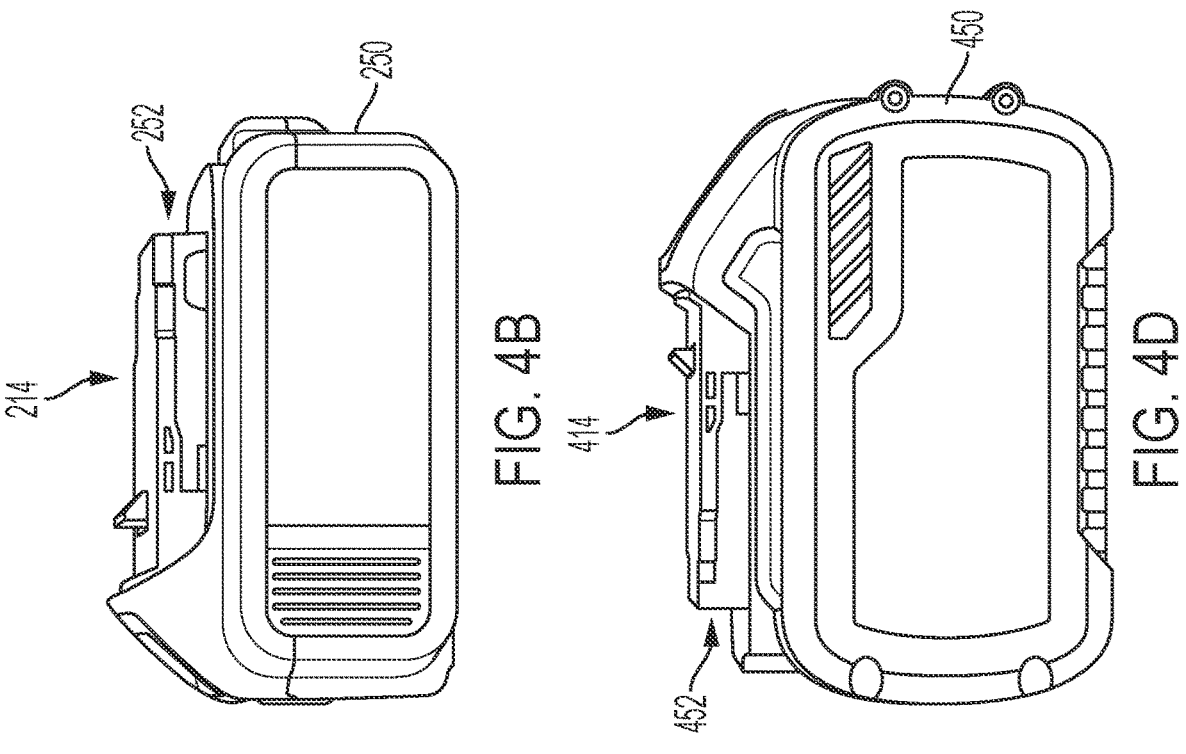
FIG. 4B
FIG. 4D
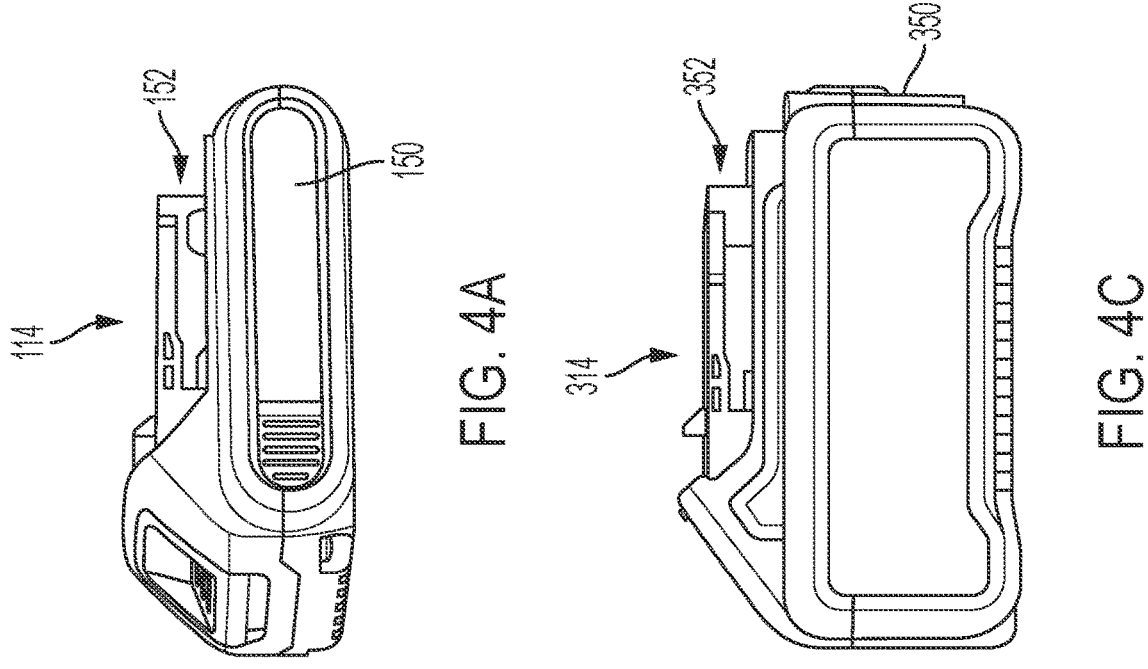
FIG. 4A
FIG. 4C

432

412

312a

332a

212a

232a

64

POWER TOOL WITH BATTERY PACK ENCLOSURE

RELATED APPLICATION

This application claims priority, under 35 U.S.C. § 120, to U.S. patent application Ser. No. 17/325,386, filed May 20, 2021, titled "Power Tool with Battery Pack Enclosure," which claims priority, under 35 U.S.C. § 119(e), to U.S. Provisional Application No. 63/028,622, filed May 22, 2020, titled "Power Tool with Battery Pack Enclosure," each of which is incorporated by reference.

TECHNICAL FIELD

This application relates to a power tool with a battery pack enclosure.

BACKGROUND

Cordless power tools are powered by rechargeable battery packs that are removably attachable to battery pack receptacles. A family of power tools may share a common battery pack receptacle and a common set of battery packs. In many such power tools, the battery packs remains at least partially exposed from the power tools when the battery packs are coupled to the power tools. When such power tools and battery packs are used in certain applications, the battery packs can be subjected to contamination, e.g., by dust, spray fluids, moisture, cleaning fluids, and/or metal shavings.

SUMMARY

In an aspect, a power tool kit or system includes a power tool, a battery pack, and an enclosure. The power tool includes a tool housing, a motor received in the tool housing, an output member driven the motor and configured to perform an operation, and a battery pack receptacle coupled to the tool housing. The battery pack receptacle includes an exterior surface and an interior portion that includes a first mechanical and electrical interface. A battery pack includes a battery housing containing at least one battery cell and a second mechanical and electrical interface coupled to the battery housing. The battery pack is configured to be removably coupled to the battery pack receptacle to provide power to the motor with the second mechanical and electrical interface received in the interior portion of the battery pack receptacle to be mechanically and electrically coupled with the first mechanical and electrical interface and at least a portion of the battery housing extending out of the interior portion of the battery pack receptacle. The enclosure has first and second enclosure members configured to be retrofittedly coupled to the battery pack receptacle so that the first and second enclosure members cover at least a portion of the battery back receptacle and at least a portion of the portion of the battery housing that extends out of the interior portion of the battery pack receptacle while allowing the battery pack to be removed from the battery pack receptacle while the enclosure remains coupled to the battery pack receptacle.

Implementations of this aspect may include one or more of the following features. The tool housing may include a handle having a first end portion coupled to a remaining portion of the tool housing and a second end portion coupled to the battery pack receptacle. The first end portion of the handle may have a first cross-sectional shape and the battery pack receptacle may have a second cross-sectional shape that is larger than the first cross-sectional shape. The first mechanical and electrical interface may include at least one first rail extending transverse to the handle and a first terminal block with a first set of electrical terminals. The second mechanical and electrical interface may include at least one second rail configured to mechanically engage the at least one first rail and a second terminal block with a second set of electrical terminals configured to electrically couple to the first set of electrical terminals when the battery pack is received in the battery pack receptacle. The first mechanical and electrical interface may include an elongated recess that extends into the handle and a first set of electrical terminals at a bottom of the recess in the handle. The second mechanical and electrical interface may include a tower configured to be received in the recess and a second set of electrical terminals configured to electrically couple to the second set of electrical terminals when the battery pack is received in the battery pack receptacle.

The exterior surface of the battery pack receptacle may include a top surface and a peripheral side surface. The first and second enclosure members may include a first clamshell member and a second clamshell member configured to be retained around at least one of the top surface and the peripheral side surface. Each of the first and second clamshell members may have a top wall portion configured to be received over at least one of the top surface and the peripheral side surface and a sidewall portion that extends downward from the top wall portion over the peripheral side surface and at least a portion of the battery housing when the battery pack is received in the battery pack receptacle. Each of the first and second clamshell members further may include a bottom wall portion extending toward one another to cover a bottom surface of the battery housing when the battery is received in the battery receptacle. The battery enclosure further may include a door coupled to the first and second clamshell members, the door configured to be openable to removably insert and remove the battery pack in the battery pack receptacle. The first and second clamshell members and the door may completely enclose the battery pack when the battery pack is inserted into the battery pack receptacle. The enclosure may be configured to receive a plurality of different battery pack sizes within the enclosure.

The battery pack may include a latch and a button for actuating the latch to removably lock the battery pack in the battery pack receptacle, the button being accessible for actuation when the door is opened. The first and second clamshell members each may include an elastomeric member configured to form a seal between the clamshell members and the battery pack receptacle. The first and second clamshell members may be configured to be snap fit to one another when received over the battery pack receptacle. The first and second clamshell members are configured to be coupled to one another with one or more threaded fasteners. The enclosure may be configured to be retrofittedly attached to a plurality of other power tools each having a similarly configured battery pack receptacle.

In another aspect, a battery pack enclosure is configured to be retrofittedly coupled to a battery pack receptacle of a power tool, where the battery pack receptacle is configured to receive a removable battery pack that has a mechanical and electrical interface received in an interior portion of the battery pack receptacle and a battery housing extending out of and exposed from the interior portion of the battery pack receptacle. The battery pack enclosure incudes first and second enclosure members configured to be retrofittedly coupled to the battery pack receptacle so that the first and second enclosure members cover at least a portion of the battery back receptacle and at least a portion of the portion of the battery housing that extends out of the interior portion of the battery pack receptacle, allowing the battery pack to be removed from the battery pack receptacle while the enclosure remains coupled to the battery pack receptacle.

Implementations of this aspect may include one or more of the following features. The first and second enclosure members may include a first clamshell member and a second clamshell member configured to be retained around at least one of a top surface and a peripheral side surface of the battery pack receptacle. Each of the first and second clamshell members may have a top wall portion configured to be received over at least one of the top surface and the peripheral side surface and a sidewall portion that extends downward from the top wall portion over the peripheral side surface and at least a portion of the battery housing when the battery pack is received in the battery pack receptacle. Each of the first and second clamshell members further may include a bottom wall portion extending toward one another to cover a bottom surface of the battery housing when the battery is received in the battery receptacle. The battery enclosure further may include a door coupled to the first and second clamshell members, the door configured to be openable to removably insert and remove the battery pack in the battery pack receptacle. The first and second clamshell members and the door may completely enclose the battery pack when the battery pack is inserted into the battery pack receptacle. The enclosure may be configured to receive a plurality of different battery pack sizes within the enclosure.

The battery pack received in the enclosure may include a latch and a button for actuating the latch to removably lock the battery pack in the battery pack receptacle, the button being accessible for actuation when the door is opened. The first and second clamshell members each may include an elastomeric member configured to form a seal between the clamshell members and the battery pack receptacle. The first and second clamshell members may be configured to be snap fit to one another when received over the battery pack receptacle. The first and second clamshell members may be configured to be coupled to one another with one or more threaded fasteners. The enclosure may be configured to be retrofittedly attached to a plurality of power tools each having a similarly configured battery pack receptacle. The power tool may be a fluid sprayer. The fluid sprayer may be configured to spray one or more of paint, finish, architectural coating, disinfectant, sanitizer, decontaminate, cleaner, and deodorizer.

In another aspect, a modular battery pack enclosure for a power tool that interfaces with a battery pack, the battery back attaching and detaching from a handle portion of the power tool, includes a housing. The housing has a first opening configured to receive at least a part of the handle portion of the power tool, an internal cavity configured to accommodate the battery pack, and a second opening configured to allow passage of the battery pack into and out of the internal cavity. A door is attached to the housing and moveable relative to the housing between an open position and a closed position relative to the housing. The door covers the second opening when in the closed position and the second opening is exposed when the door is in the open position to allow the battery pack to be inserted into and removed from the cavity of the housing and to be coupled attached and detached from the handle portion of the power tool.

Implementations of this aspect may include one or more of the following features. The first opening of the housing may form a collar attachment about the part of the handle portion. The housing may include two side pieces that attach together to attach the modular battery enclosure to the handle portion of the power tool and separate to decouple the modular battery enclosure from the handle portion of the power tool.

In another aspect, a handheld fluid sprayer includes a sprayer housing having a handle, a reservoir supported by the sprayer housing, an electric motor supported by the sprayer housing, and a pump supported by the sprayer housing and operably connected to the electric motor to be powered by the electric motor, the pump configured to pump fluid from the reservoir to a spray nozzle for spraying. A battery receptacle is disposed at an end of the handle, the battery receptacle configured to mechanically and electrically connect to a battery to support the battery on the sprayer housing. A battery enclosure is supported by the handle, the battery enclosure configured to cover at least a portion of the battery receptacle and at least a portion of a battery housing of a battery mounted to the battery receptacle. The battery enclosure is configured such that the battery can be mounted to and dismounted from the battery receptacle with the battery enclosure supported by the handle.

Implementations of this aspect may include one or more of the following features. The battery enclosure may be formed from a clamshell. The battery enclosure may include a first enclosure member having a first top wall and a first peripheral side wall, and a second enclosure member having a second top wall and a second peripheral side wall. The first enclosure member may further include a first bottom wall spaced from the first top wall by the first peripheral side wall. The second enclosure member may further include a second bottom wall spaced from the second top wall by the second peripheral side wall. The first bottom wall and the second bottom wall may cover a bottom side of the battery housing of the battery. A drainage opening may be formed through at least one of the first bottom wall and the second bottom wall. A first elastomeric member may be supported by the first top wall, the first elastomeric member configured to interface with the first enclosure member and one of the handle and the battery pack receptacle to form a fluid-tight seal.

The battery enclosure may further include a door supported by a body of the battery enclosure, the door configured to move between a closed state and an open state, wherein the door covers an opening defined at least partially by the body of the battery enclosure when the door is in the closed state, and wherein the door uncovers the opening when the door is in the open state such that the battery can be mounted to and dismounted from the battery receptacle with the door in the open state. The door may be pivotably mounted to the body of the battery enclosure. The battery may be fully enclosed within the battery enclosure with the door in the closed state. The battery enclosure may be mounted to the battery receptacle.

In another aspect, a battery enclosure for covering at least a portion of a battery is mounted to a battery receptacle disposed at an end of a handle of a sprayer housing of a handheld fluid sprayer to power an electric motor of the handheld fluid sprayer. The battery enclosure includes a first enclosure member having a first top wall configured to extend partially around the battery and a first peripheral side wall, the first peripheral side wall extending downward from the first top wall, and a second enclosure member having a second top wall and a second peripheral side wall, the second peripheral sidewall extending downward from the second top wall. The second enclosure member may be configured to mate with the first enclosure member in a clamshell over one of a top surface of the battery pack receptacle and a side surface of the battery pack receptacle.

Implementations of this aspect may include one or more of the following features. The battery enclosure may be configured to cover at least a portion of the battery receptacle and at least a portion of a battery housing of the battery mounted to the battery receptacle. The battery enclosure may be configured such that the battery can be mounted to and dismounted from the battery receptacle with the battery enclosure supported by the handle. The battery enclosure may further include a first elastomeric member supported by the first top wall, and a second elastomeric member supported by the second top wall. The first elastomeric member and the second elastomeric member may be configured to interface with one of the handle and the battery pack receptacle to form a fluid-tight seal.

The first enclosure member may include a first bottom wall spaced from the first top wall by the first peripheral side wall, and the second enclosure member may include a second bottom wall spaced from the second top wall by the second peripheral side wall. The first bottom wall may be configured to mate with the second bottom wall. A drainage opening may be formed through at least one of the first bottom wall and the second bottom wall. The battery enclosure may include a door supported by a body of the battery enclosure, the door configured to move between a closed state and an open state. The door may be pivotably mounted to the body of the battery enclosure. The battery enclosure may be fully enclosed with the door in the closed state. The first enclosure member and the second enclosure member may mate to define an opening such that the battery can slide onto the battery receptacle through the opening during mounting and the battery can slide off of the battery receptacle through the opening during dismounting. The first enclosure member may be fixed to the second enclosure member by a plurality of fasteners.

In another aspect, a handheld fluid sprayer includes a sprayer housing having a handle, a reservoir supported by the sprayer housing, an electric motor supported by the sprayer housing, and a pump supported by the sprayer housing and operably connected to the electric motor to be powered by the electric motor, the pump configured to pump fluid from the reservoir to a spray nozzle for spraying. A battery receptacle is disposed at an end of the handle, the battery receptacle configured to mechanically and electrically connect to a battery to support the battery on the sprayer housing. A battery enclosure is supported by the handle, the battery enclosure formed in a clamshell by a first enclosure member and a second enclosure member. The battery enclosure is configured to cover at least a portion of the battery receptacle and at least a portion of a battery housing of a battery mounted to the battery receptacle. The battery enclosure is configured such that the battery can be mounted to and dismounted from the battery receptacle with the battery enclosure supported by the handle.

Implementations of this aspect may include one or more of the following features. The first enclosure member may include a first top wall, a first peripheral side wall, and a first bottom wall spaced from the first top wall by the first peripheral side wall. The second enclosure member may include a second top wall, a second peripheral side wall, and a second bottom wall spaced from the second top wall by the second peripheral side wall. The first bottom wall and the second bottom wall may cover a bottom side of the battery housing of the battery. The battery enclosure may include a door supported by a body of the battery enclosure, the door configured to move between a closed state and an open state.

The door may cover an opening defined at least partially by the body of the battery enclosure when the door is in the closed state, and the door may uncover the opening when the door is in the open state such that the battery can be mounted to and dismounted from the battery receptacle with the door in the open state. The battery may be fully enclosed within the battery enclosure with the door in the closed state. The battery may be configured to mount to the battery receptacle by a sliding interface such that the battery slides away from the reservoir during dismounting. The battery enclosure may include a top side, a bottom side, a plurality of peripheral sides, and a door movable between an open state and a closed state. The door may be configured to uncover an opening through which the battery can be mounted and dismounted with the door in the open state and wherein the door is configured to cover the opening with the door in the closed state.

Advantages may include one or more of the following. The battery pack enclosure may help protect the battery pack from contamination, e.g., by dust, moisture, cleaning fluids, and/or metal shavings, while accommodating a variety of configurations of battery packs and enabling fast and easy insertion and removal of the battery packs from the power tools. The battery pack enclosure may also be used to retrofit an enclosure on a variety of similarly configured power tools in a power tool family. These and other advantages and features will be apparent from the description, the drawings, and the claims.

BRIEF DESCRIPTION OF THE DRAWINGS

FIGS. 4A-4D are side views of additional embodiments of battery packs for use with the power tool of FIG. 1.

DETAILED DESCRIPTION

Figure 2:
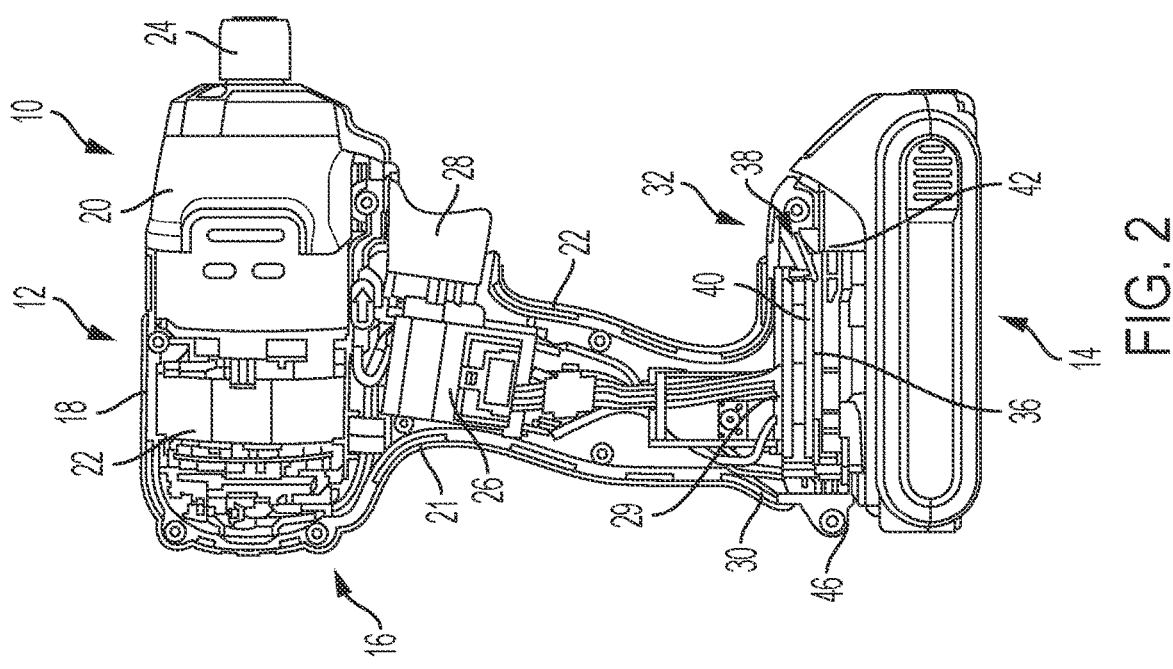
FIG. 2 is a side view of the power tool of FIG. 1 with a portion of the tool housing removed.
Figure 1:
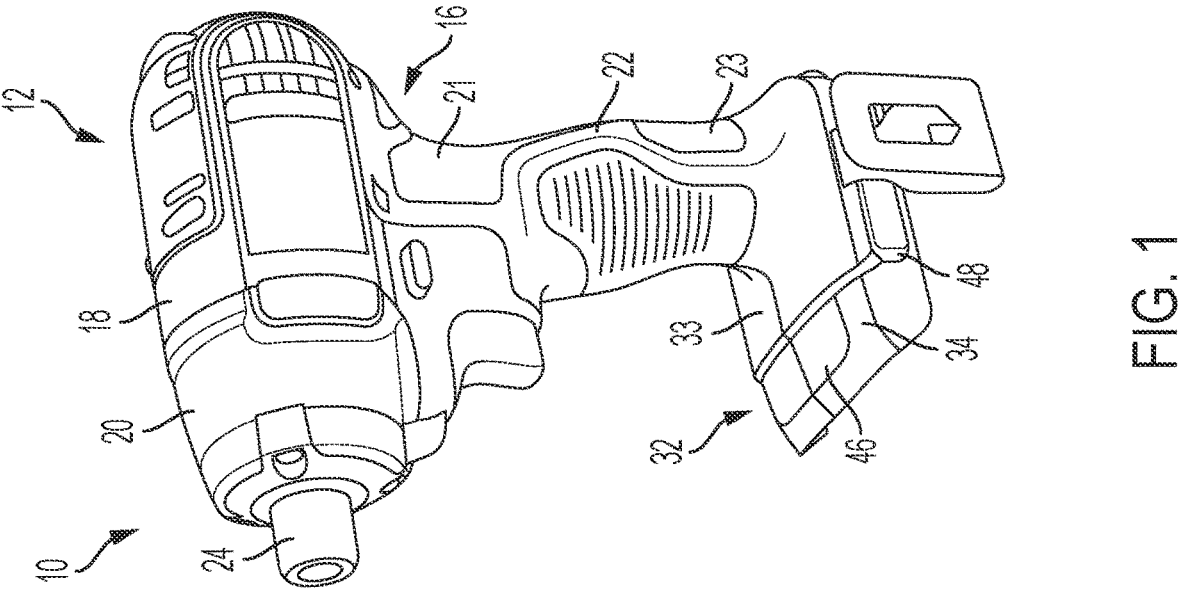
FIG. 1 is a perspective view of an embodiment of a power tool.
Figure 4:
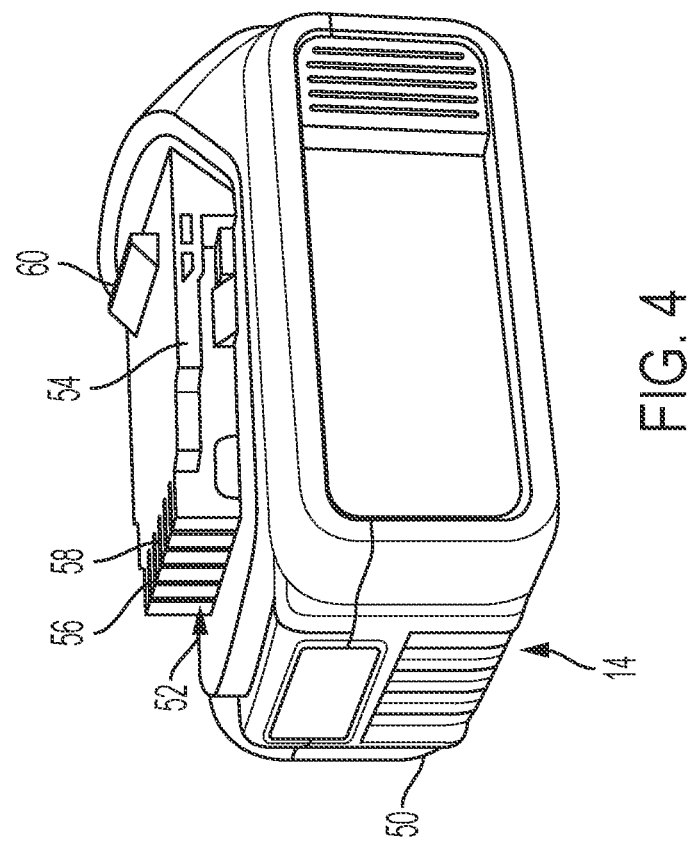
FIGS. 3 and 4 are perspective views of an embodiment of a battery pack for use with the power tool of FIG. 1.
Figure 3:
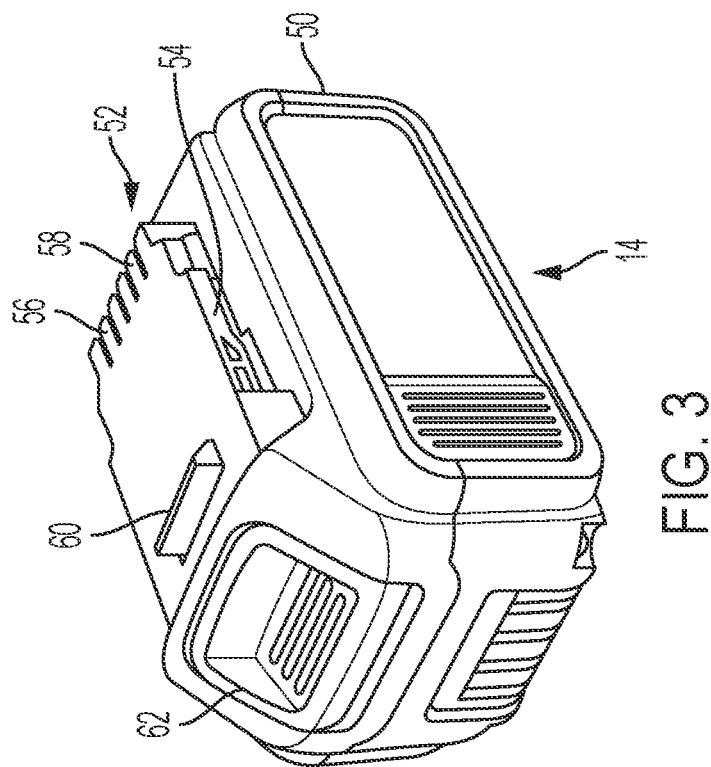

Referring to FIGS. 1-4, a system or kit 10 of power tools and battery packs include a first power tool 12 and a first battery pack 14. The first power tool 12 (e.g., an impact driver) includes a tool housing 16 having a motor housing 18, a transmission housing 20 extending forward of the motor housing 18, and a handle 22 having a first end portion 21 coupled to the motor housing 18. An electric motor 22 is received in the tool housing 16 (e.g., in the motor housing 18) and is configured to drive an output member 24 to perform an operation (e.g., drilling a hole, driving a fastener, spraying a solution) on a workpiece. A transmission (not shown) (e.g., a planetary gear transmission and/or a rotary impact mechanism) is received in the transmission housing 20 and configured to transmit rotary output from the motor 22 to the output member 24 to perform the operation. Received in the handle is a switching member 26 actuated by an external trigger 28 and a control module or circuit 29 (e.g., including a microcontroller) that controls power delivery to the motor 22.

Coupled to a second end portion 30 of the handle 22 is a battery receptacle 32. The end portion 30 of the handle has a first shape 23 with a first cross-sectional area and the battery pack receptacle has a second shape 33 with a second cross-sectional area that is larger than the first cross-sectional area. The battery pack receptacle 32 include an exterior surface 34 and an interior portion 36 that includes a first mechanical and electrical interface 38. The interior portion 36 includes a first pair of rails 40 extending transverse to the handle 22 a first terminal block 42 that includes a first plurality of electrical terminals (not shown). The battery receptacle 32 is configured to removably receive the first battery pack 14. The exterior surface 34 includes a top surface 46 and a downwardly projecting peripheral surface 48.

The first battery pack 14 includes a battery housing 50 containing at least one battery cell (not shown) and a second mechanical and electrical interface 52 coupled to the battery housing 50. The battery pack 14 is configured to be removably coupled to the battery pack receptacle 32 on the power tool 12 to provide power to the motor 22. When coupled to the power tool 12, the second mechanical and electrical interface 52 is received in the interior portion 36 of the battery pack receptacle 32 and at least a portion of the battery housing 50 extending out of the interior portion of the battery pack receptacle 32. The second mechanical and electrical interface 52 includes a pair of second rails 54 configured to mechanically engage the first rails 40 in the battery receptacle 32 and a second terminal block 56 with a second set of electrical terminals 58 configured to electrically couple to the first set of electrical terminals 42 when the battery pack 50 is received in the battery pack receptacle 32. The first battery pack 14 also includes a latch 60 configured to releasably lock the battery pack 14 in the battery receptacle 14 when it is received in the battery pack receptacle 32 and a button 62 configured to be actuated by a user's finger to disengage the latch 60 to remove the battery pack 50 from the battery pack receptacle 50.

Referring also to FIGS. 4A-4D, the system or kit 10 may include a plurality of additional battery packs 114, 214, 314, 414. Each of the battery packs 114, 214, 314, 414 has a second mechanical and electrical interface 152, 252, 352, 452 that is substantially the same as the battery pack interface 52 on the first battery pack 14 and has a similar operating voltage (e.g., 18V or 20V) to enable the battery packs 114, 214, 314, 414 to be used interchangeably with the first power tool 12. The battery packs 114, 214, 314, 414 differ from the first battery pack 14 in that each of them has a battery pack housing 150, 250, 350, 450 that is at least somewhat different in size, dimensions, and/or configuration than the housing 50 of the first battery pack 14. The housings 150, 250, 350, 450 may be different to accommodate different quantities and arrangements of battery cells so that the battery packs 114, 214, 314, 414 may have different capacities (e.g., 1.5 Ah, 5 Ah, 6 Ah, and 9 Ah, respectively).

Figure 5A:
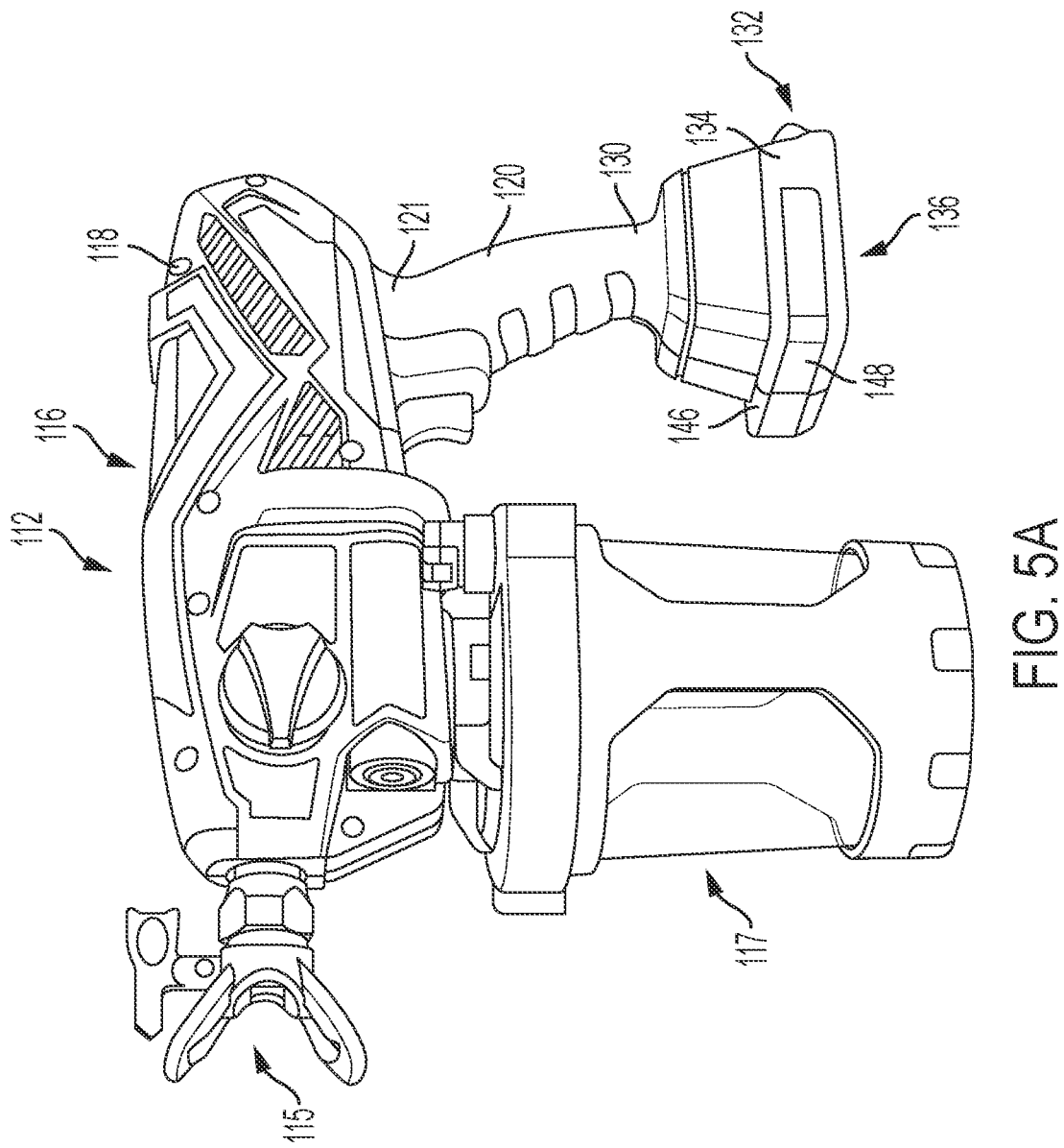
FIGS. 5A-5B are perspective views of another embodiment of a power tool usable with the battery packs of FIGS. 3-4D.
Figure 5B:
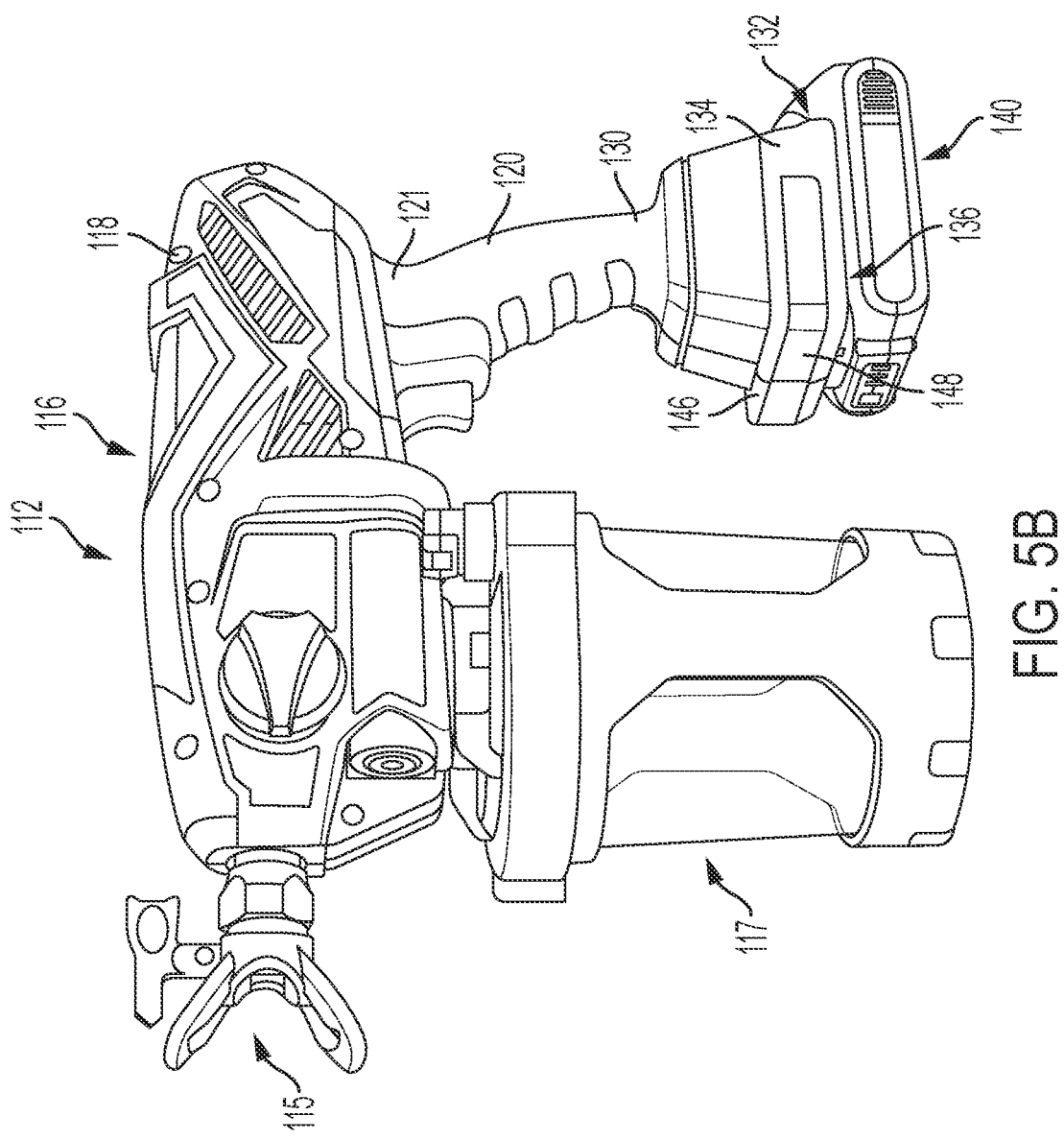

The system or kit 10 also may include one or more additional power tools and other related products (e.g., drills, impact wrenches, circular saws, reciprocating saws, miter saws, grinders, nailers, lights, radios, speakers, fluid sprayers, and rotary hammers) that may be powered by one or more of the battery packs 14, 114, 214, 314, 414. For example, as shown in FIGS. 5A-5B and 6C, the system or kit 10 may include a second power tool 112 (e.g., a sprayer) having a tool housing 116 that includes a motor housing 118 and a handle 120. The motor housing 118 contains a pump 121 and an electric motor 122 configured to operate the pump 121. The pump 121 can be any type of pump, such as a piston or diaphragm pump. The second power tool 112 includes a spray tip 113 with a spray nozzle 115 for atomizing a spray fluid (e.g., paints, finishes, architectural coatings, disinfectants, sanitizers, decontaminates, cleaners, deodorizers, and/or similar fluids) in a spray fan for application to a surface. The second power tool 112 includes, in this embodiment, a reservoir 117 for holding the spray fluid, and from which the pump draws. The handle 120 has a first end portion 121 coupled to the motor housing 118 with a trigger 119 for controlling power delivery to the motor. Coupled to a second end portion 130 of the handle 120 is a battery receptacle 132 having a configuration substantially similar to the battery receptacle 32 of the first power tool 12. The battery pack receptacle 132 includes an exterior surface 134 and an interior portion 136 that includes a first mechanical and electrical interface 138 similar to the first mechanical and electrical interface 38. The battery receptacle 132 is configured to removably receive one or more of the battery packs 14, 114, 214, 314, 414. The exterior surface 134 includes a top surface 146 and a downwardly projecting peripheral surface 148. The battery receptacle 132 includes a control board 135 with a controller or control circuit configured to control power delivery to the motor 122 in response to input from the trigger 119.

Figure 6A:
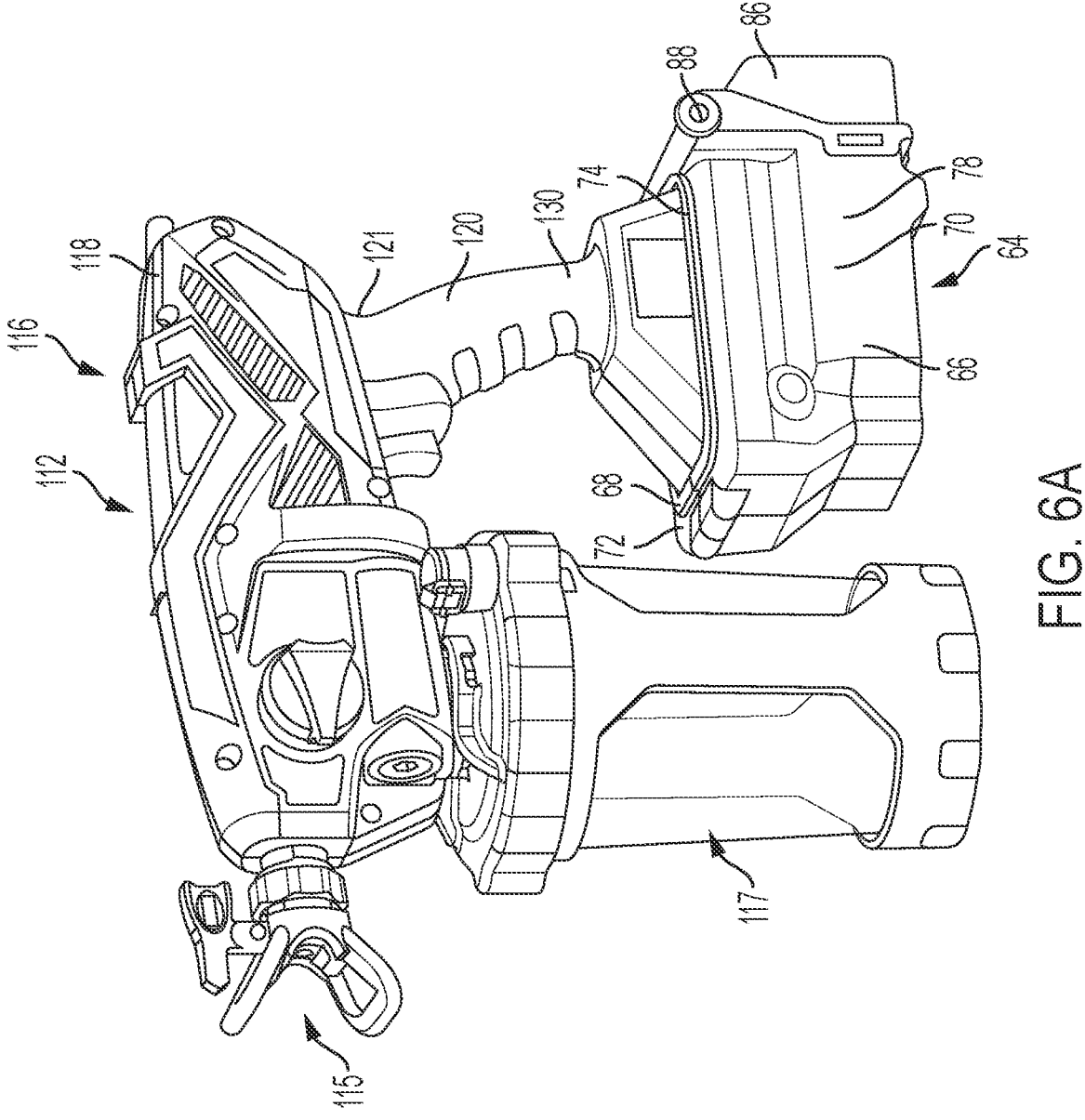
FIG. 6A-6B are perspective views of the power tool of FIGS. 5A-5B with an embodiment of a battery pack enclosure retrofittedly coupled to the power tool.
Figure 6B:
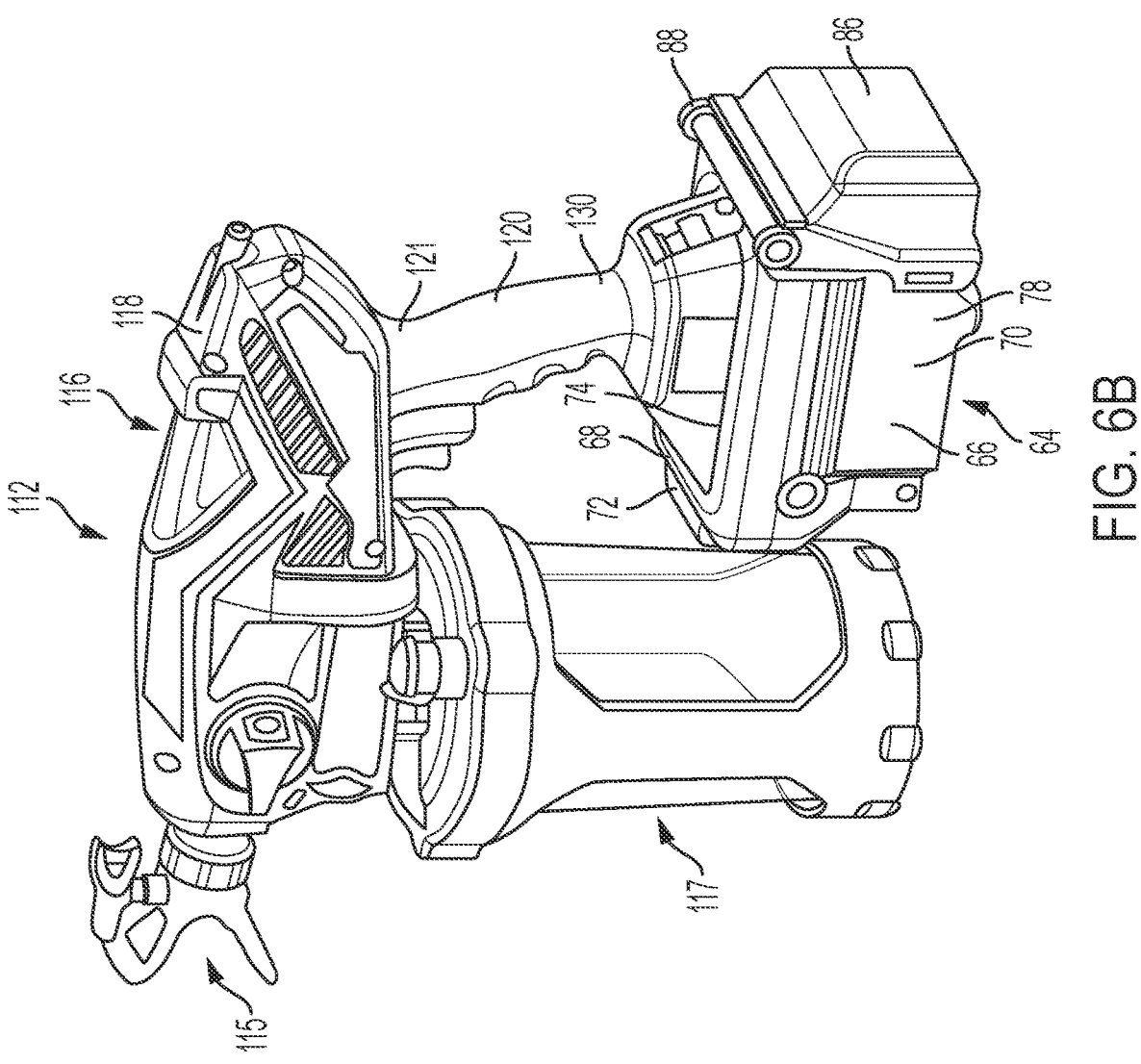
Figure 6C:
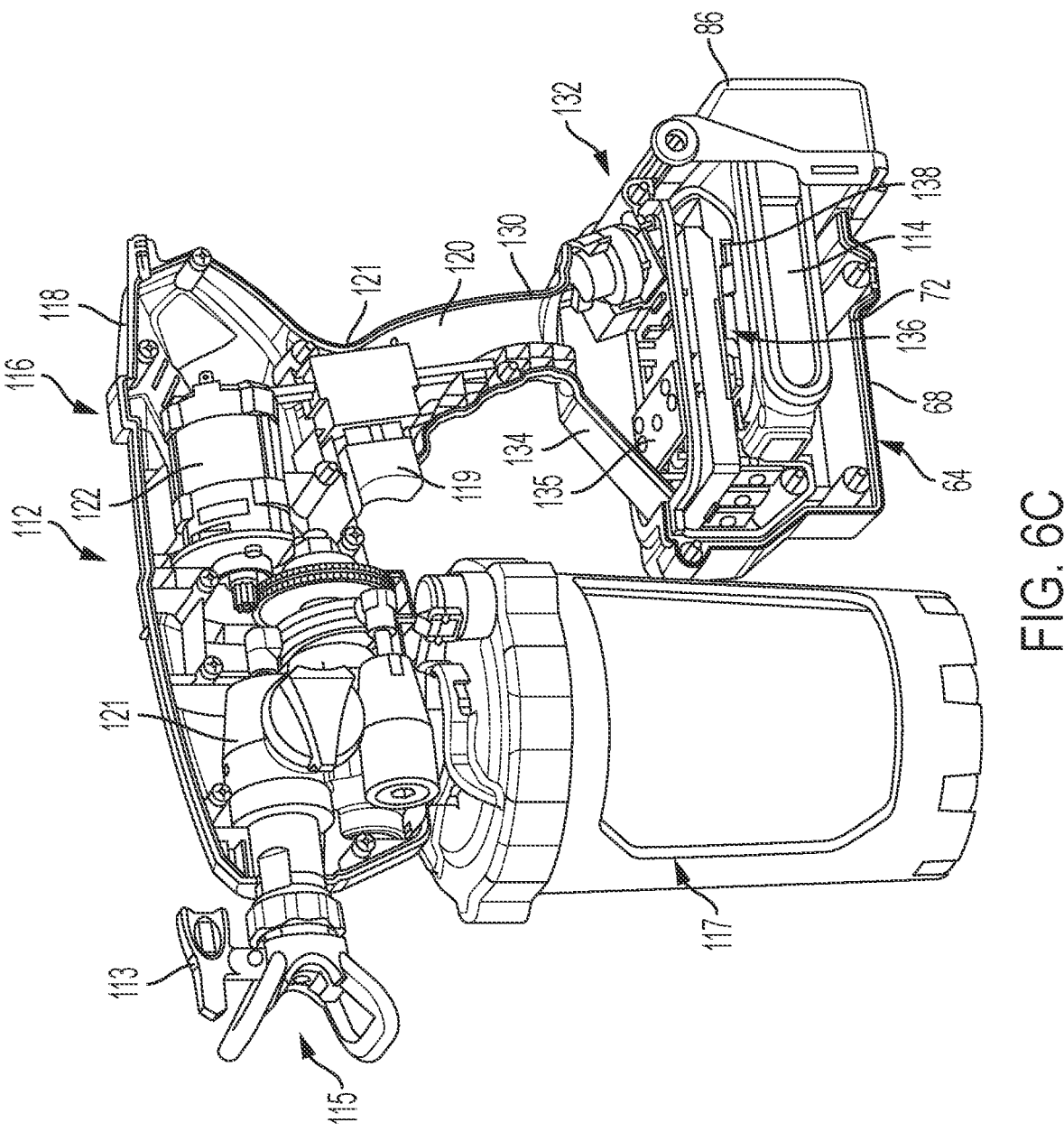
FIG. 6C is a perspective view of the power tool and battery pack enclosure of FIGS. 6A-6B, with a portion of the tool housing removed.
Figure 7:
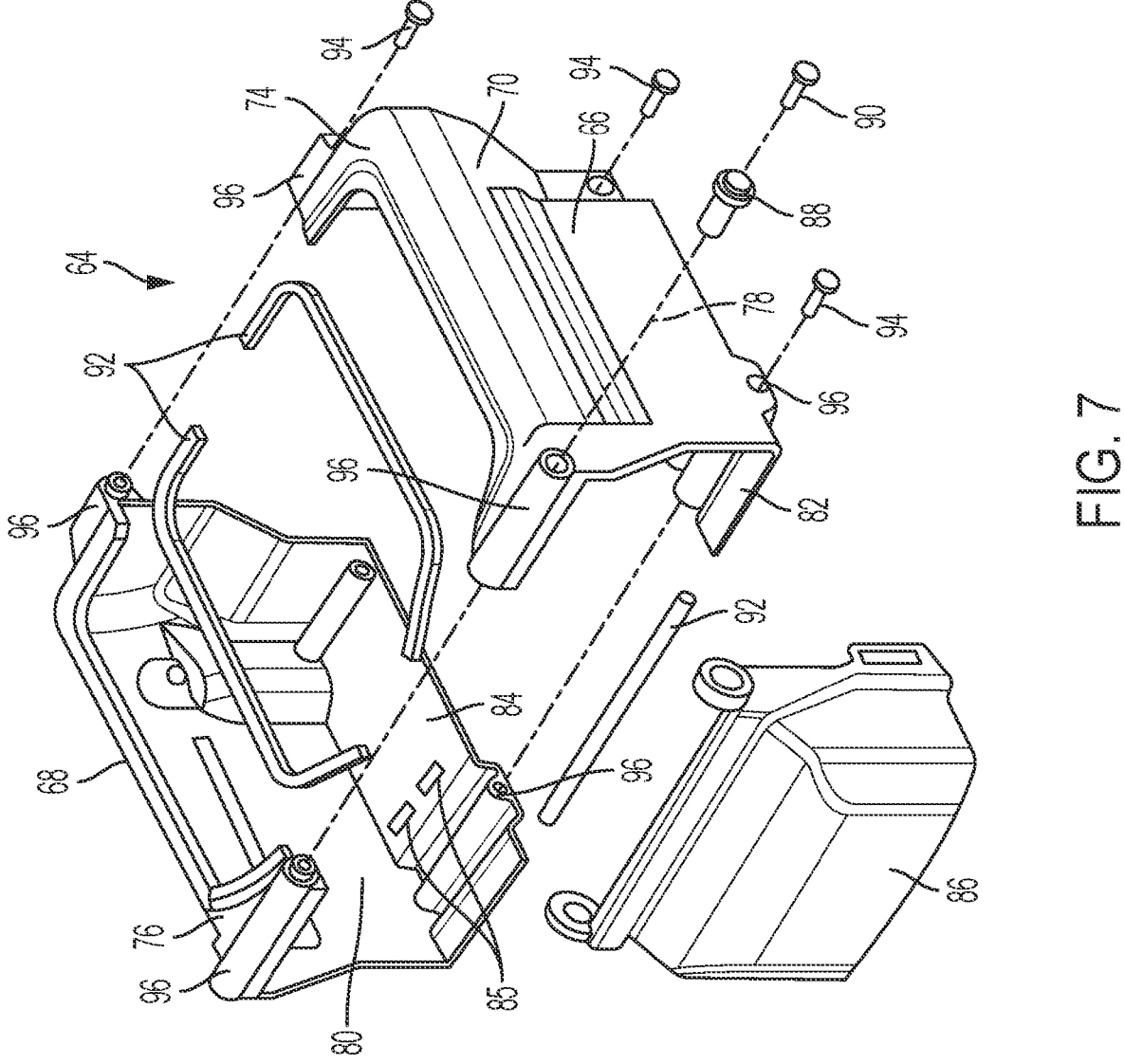
FIG. 7 is an exploded view of the battery enclosure of FIGS. 6A-6B.
Figure 8:
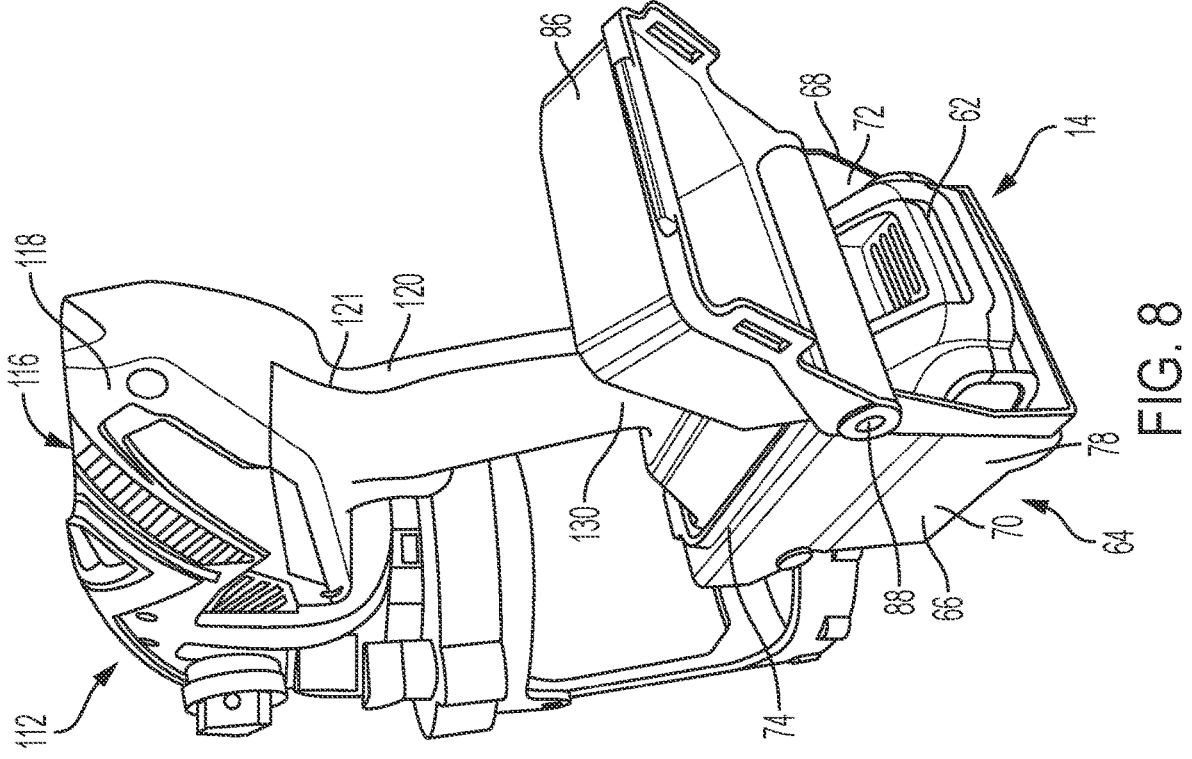
FIG. 8 is a rear perspective view of the battery enclosure of FIGS. 6A-6B coupled to the power tool of FIGS. 5A-5B.

Referring also to FIGS. 6A-7, in order to protect the battery packs from contamination, e.g., due to dust, moisture, fluids (e.g., cleaning, disinfection, etc.), and/or metal shavings, an enclosure 64 may be provided that can be retrofitted onto the battery pack receptacles 32, 132. In an embodiment, the enclosure 64 includes first and second enclosure members 66, 68 configured to be retrofittedly coupled to the battery pack receptacles 32, 132 so that the first and second enclosure members 66, 68 cover at least a portion of the battery back receptacle 32, 132 and at least a portion of the portion of the battery housing 50, 150, 250, 350, 450 that extends out of the interior portion of the battery pack receptacle 32, 132 while allowing the battery pack to be removed from the battery pack receptacle 64 with the enclosure remaining coupled to the battery pack receptacle 32, 132. The first and second enclosure members 66, 68 comprise a first clamshell member 70 and a second clamshell member 72 configured to be retained around at least one of the top surface 46, 146 and the peripheral side surface 48, 148 of the battery pack receptacle 32, 132. Each of the first and second clamshell members 70, 72 has a top wall portion 74, 76 configured to be received over at least one of the top surface 46, 146 and the peripheral side surface 48, 148 of the battery pack receptacle 32, 132. The first and second clamshell members 70, 72 also each have a sidewall portion 78, 80 that extends downward from the top wall portion 74, 76 over the peripheral side surface 48, 148 of the battery pack receptacle 32, 132 and over at least a portion of the battery housing 50, 150, 250, 350, 450 when the battery pack 14, 114, 214, 314, 414 is received in the battery pack receptacle 32, 132.

Each of the first and second clamshell member 70, 72 may further include a bottom wall portion 82, 84 extending toward one another to cover a bottom surface of the battery housing 50, 150, 250, 350, 450 when the battery pack 14, 114, 214, 314, 414 is received in the battery pack receptacle 32, 132. The bottom wall portions 82, 84 may optionally include small openings 85 configured to allow fluids to drain from the enclosure 64 and/or to enable cooling airflow into the enclosure 64. The battery enclosure 64 may further include a door 86 pivotably coupled to the first and second clamshell members 70, 72 by a pair of bearing pins 88 fastened to bosses 90 in the first and second clamshells 70, 72 by threaded fasteners 90. The door 86 is configured to be openable to access the button 60 to disengage the latch 62 and to removably insert and remove the battery pack 14, 114, 214, 314, 414 in the battery pack receptacle 32, 132. In the embodiment illustrated in FIGS. 6A-7, the first and second clamshell members 70, 72 and the door completely enclose the battery pack 14, 114, 214, 314, 414 when the battery pack is received in the battery pack receptacle 32, 132.

The first and second clamshell members 70, 72 may each include one or elastomeric members 92 configured to form a seal between the clamshell members 70, 72 and the battery pack receptacle 32, 132. The first and second clamshell members 70, 72 are attached to one another by a plurality of threaded fasteners 94 received in screw bosses 96 in the clamshells 70, 72. In other embodiments, the first and second clamshell members may be configured to snap fit to one another when received over the battery pack receptacle. In yet other embodiments, the enclosure may slides into and latch to the battery pack receptacle using rails and the terminal block in the battery pack receptacle and rails corresponding, a latch and a terminal block in the enclosure.

Figure 9:
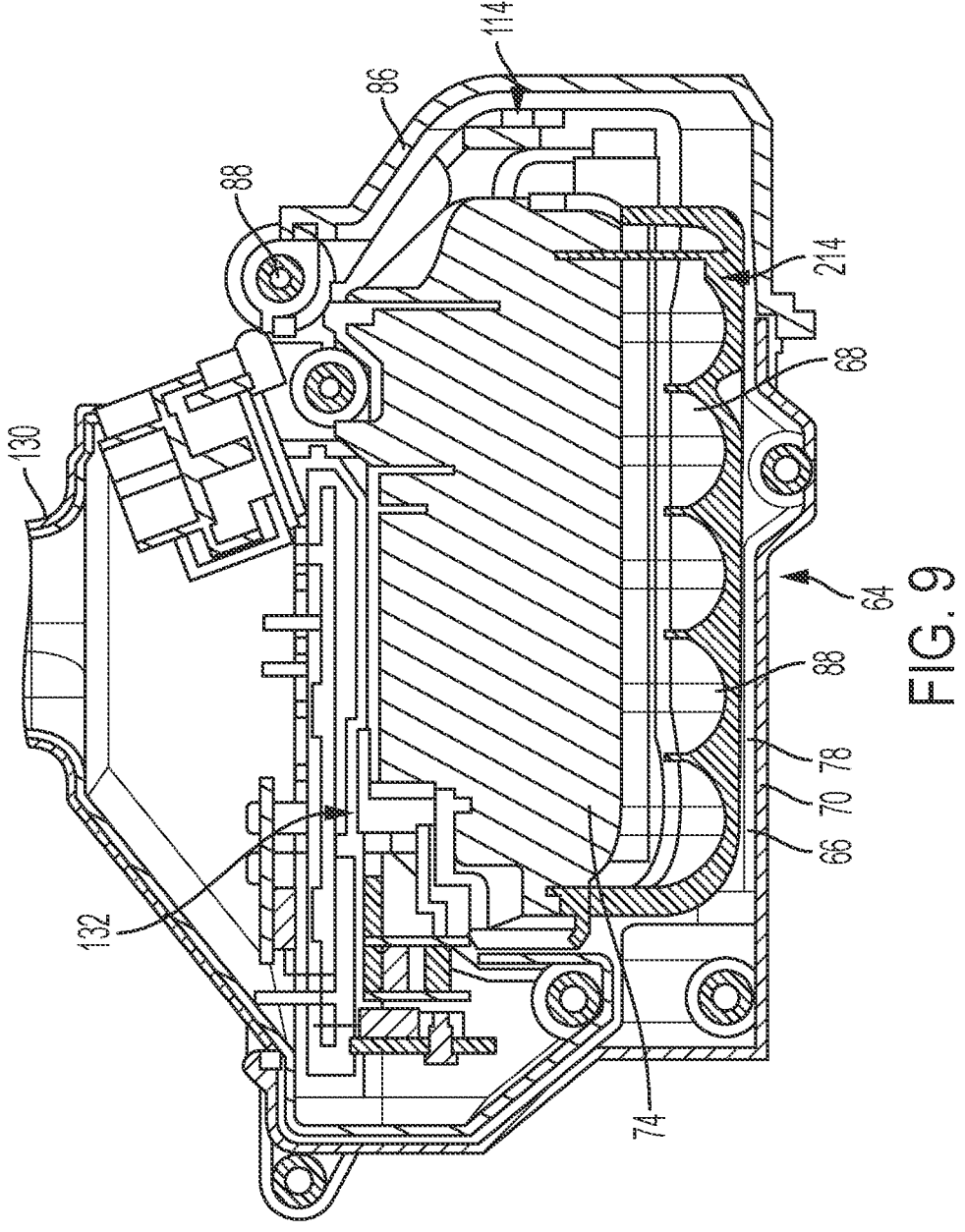
FIG. 9 is a cross-sectional view of the battery enclosure of FIGS. 6A-6B with several battery packs shown schematically coupled to the power tool.

Referring also to FIG. 9, the enclosure 64 may be sized and configured large enough to receive a plurality of different battery pack sizes (e.g., battery packs 114 and 214 as schematically illustrated in FIG. 9, but also battery packs 14, 314, 414) within the enclosure 64.

Figure 10A:
FIG. 10A is a schematic view of the battery enclosure of FIGS. 6A-6B coupleable to additional embodiments of power tools.
Figure 10B:
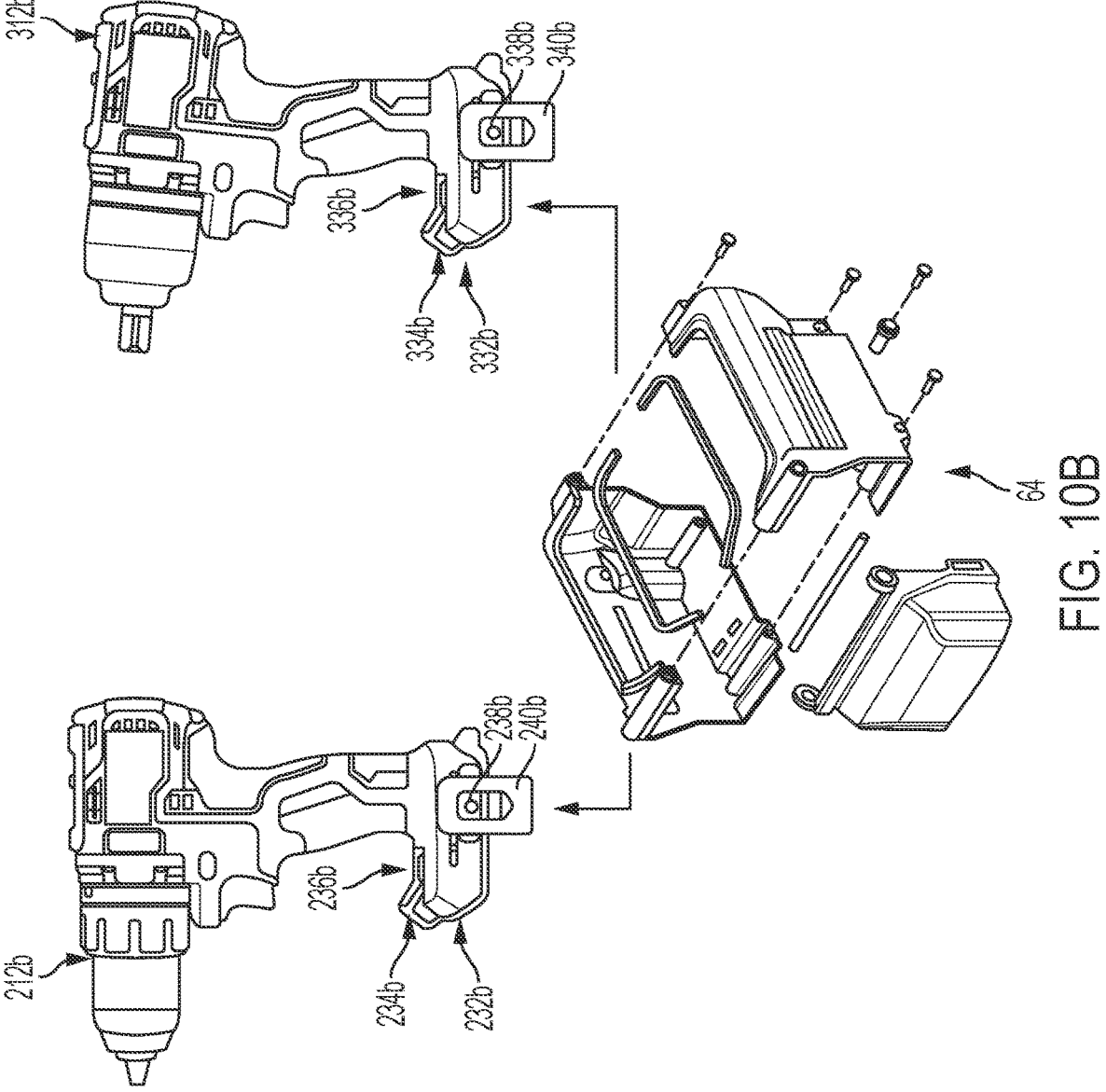
FIG. 10B is a schematic view of the battery enclosure of FIGS. 6A-6B coupleable to additional embodiments of power tools.

Referring also to FIGS. 10A-10B, the enclosure 64 may be configured to be retrofittedly attached to a plurality of other power tools 212a, 312a, 412a, 212b, 312b, each having a similarly configured battery pack receptacle 232a, 332a, 432a, 232b, 332b. With respect to the power tools 212b, 312b, the enclosure 64 may be configured to be retrofittedly attached to their battery pack receptacles 232b, 332b, while leaving their light units 234b, 334b, and their control switches 236b, 336b, exposed and user-accessible. In each of these embodiments, the enclosure or its components may be coupled to the battery pack receptacles in other manners, e.g., by interference fit with protrusions or recesses on the battery pack receptacles or by threaded fasteners received in threaded openings 238b, 338b, which are alternatively used to couple a belt clip 240a, 240b to the battery pack receptacle after removing the belt clip.

Figure 11:
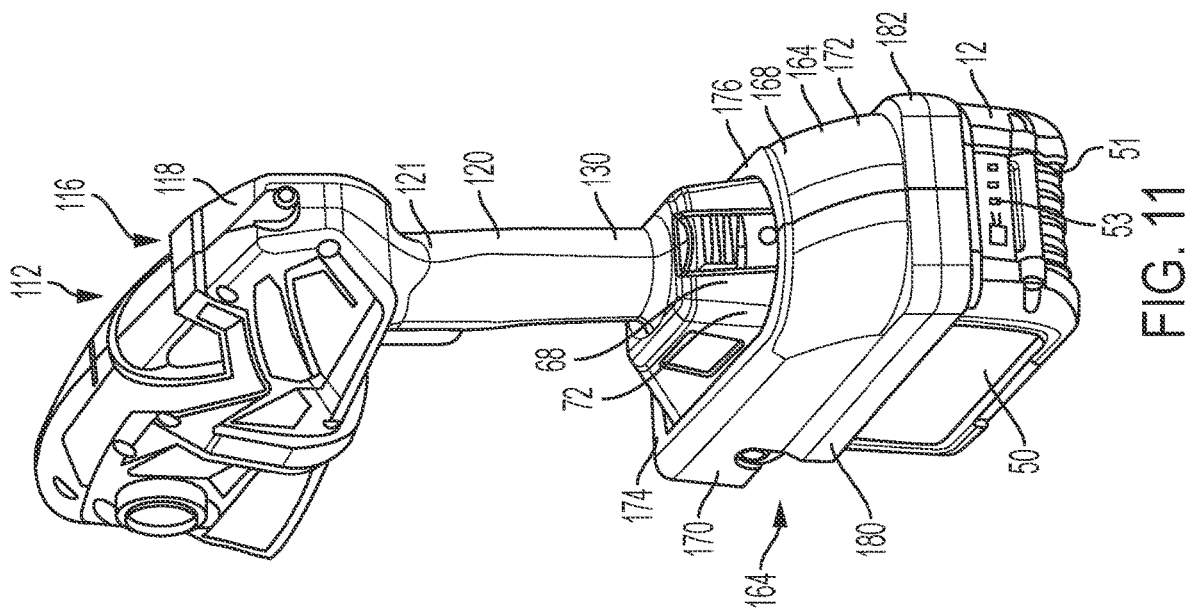
FIG. 11 is a perspective view of another embodiment of an enclosure coupled to the power tool of FIGS. 5A-5B.

Referring to FIG. 11, another embodiment of an enclosure 164 is configured to be retrofittedly coupled to the power tool 112 (or to power tools 12, 212a, 312a, 412a, 212b, 312b). The enclosure 164 comprises first and second enclosure members 166, 168 including a first clamshell member 170 and a second clamshell member 172. The clamshell members 170, 172 are configured to be retained around at least one of the top surface 146 and the peripheral side surface 148 of the battery pack receptacle 132. Each of the first and second clamshell members 170, 172 has a top wall portion 174, 176 configured to be received over at least one of the top surface 146 and the peripheral side surface 148 of the battery pack receptacle 132. The first and second clamshell members 170, 172 also each have a sidewall portion 178, 180 that extends downward from the top wall portion 174, 176 over the peripheral side surface 148 of the battery pack receptacle 32, 132 and over only a portion of the battery housing 50 when the battery pack 14 is received in the battery pack receptacle 132. The clamshells 170, 172 are snap fit together, but can be attached by fasteners such as screws. The enclosure 164 is open at the bottom so as to accommodate a variety of sizes of battery packs, to allow airflow to reach vents 51 in the bottom of the battery pack, and to allow a user to see an indicator of remaining charge 53 on the battery pack housing 50.

Figure 12:
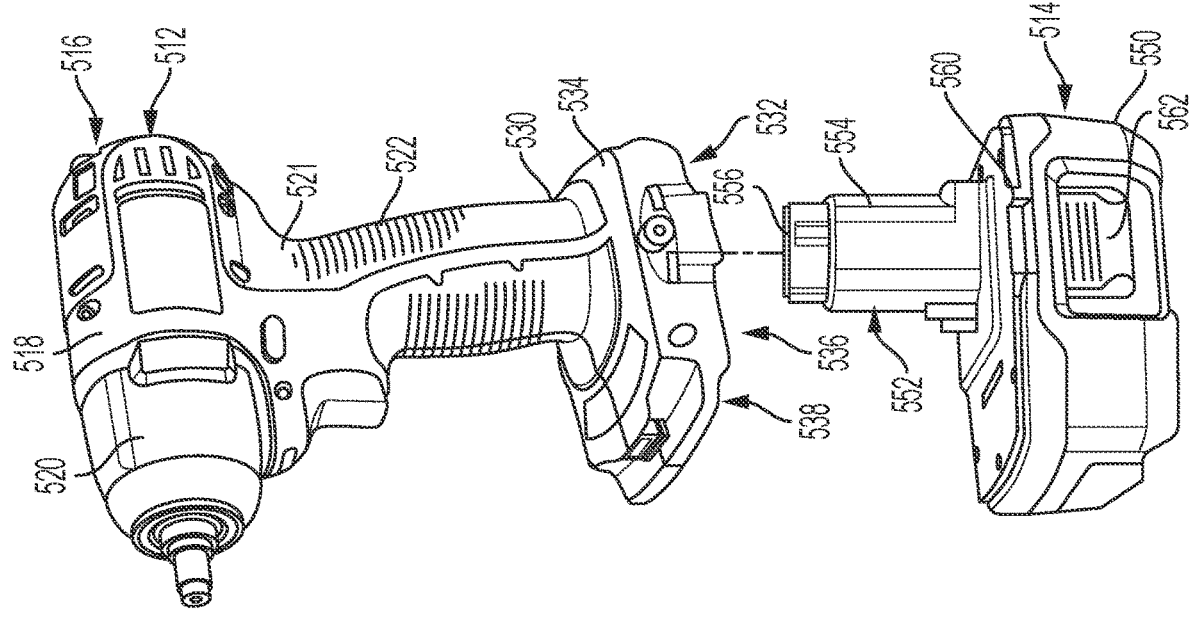
FIG. 12 is a perspective view of another embodiment of a power tool and battery pack usable with the disclosed battery pack enclosures.

Referring to FIG. 12, the enclosures 64, 164 may be usable with an alternative embodiment of a power tool 512 and battery pack 514. The power tool 512 (e.g., an impact driver) includes a tool housing 516 having a motor housing 518, a transmission housing 520 extending forward of the motor housing 518, and a handle 522 having a first end portion 521 coupled to the motor housing 518. Coupled to a second end portion 530 of the handle 522 is a battery receptacle 532. The battery receptacle 532 include an exterior surface 534 and an interior portion 536 that includes a first mechanical and electrical interface 538. The first mechanical and electrical interface 538 includes an elongated recess that extends into the handle 522 and a first set of electrical terminals at a top of the recess in the handle. The battery pack 514 includes a battery housing 550 containing at least one battery cell (not shown) and a second mechanical and electrical interface 552 coupled to the battery housing 550. The battery pack 514 is configured to be removably coupled to the battery pack receptacle 532 on the power tool 512 to provide power to the motor. The second mechanical and electrical interface 552 includes a tower 554 configured to be received in the recess in the handle 522 and a second set of electrical terminals 556 configured to electrically couple to the second set of electrical terminals when the battery pack is received in the battery pack receptacle. When coupled to the power tool 512, at least a portion of the battery housing 550 extends out of the of the battery pack receptacle 532. The battery pack 514 also has a latch 560 for locking the battery pack 514 in the battery pack receptacle 532 and a button 562 for disengaging the latch 560 to remove the battery pack 514 from the receptacle 532. The enclosure 164 of FIG. 11 can be coupled to the battery back receptacle 532 with little or no modification. The enclosure 64 of FIG. 7 can be coupled to the battery pack receptacle 532 if modified so that that door to the enclosure is on the bottom of the receptacle 532, allowing the battery pack 514 to be accessed to remove the battery pack 514 from the power tool 512.

Figure 13B:
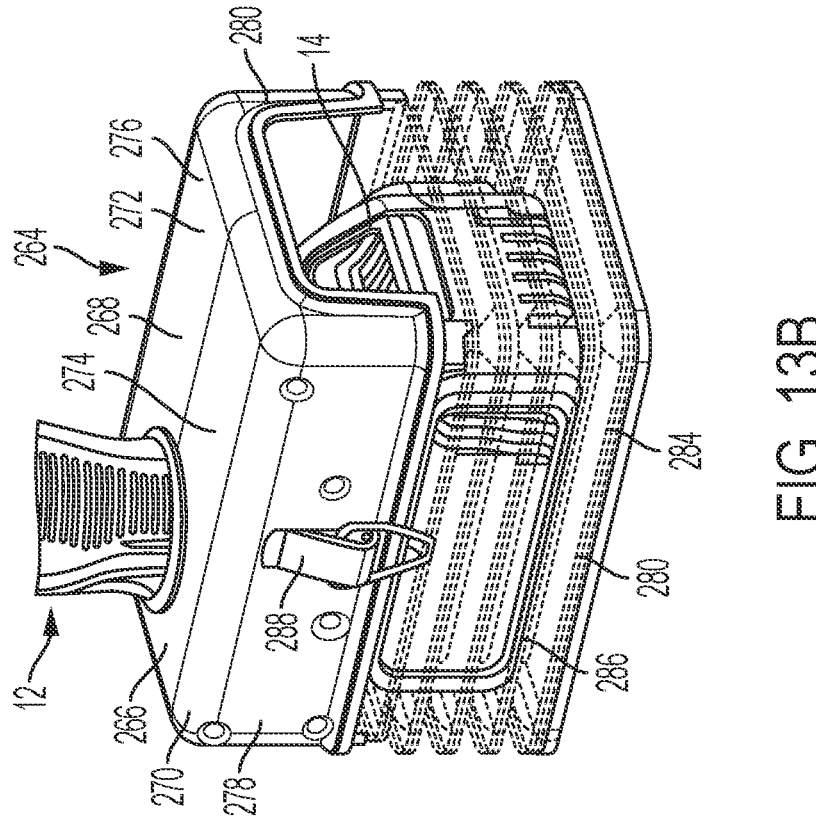
FIGS. 13A-13B are perspective views of another embodiment of a battery pack enclosure retrofittedly coupled to one of the aforementioned power tools.
Figure 13A:
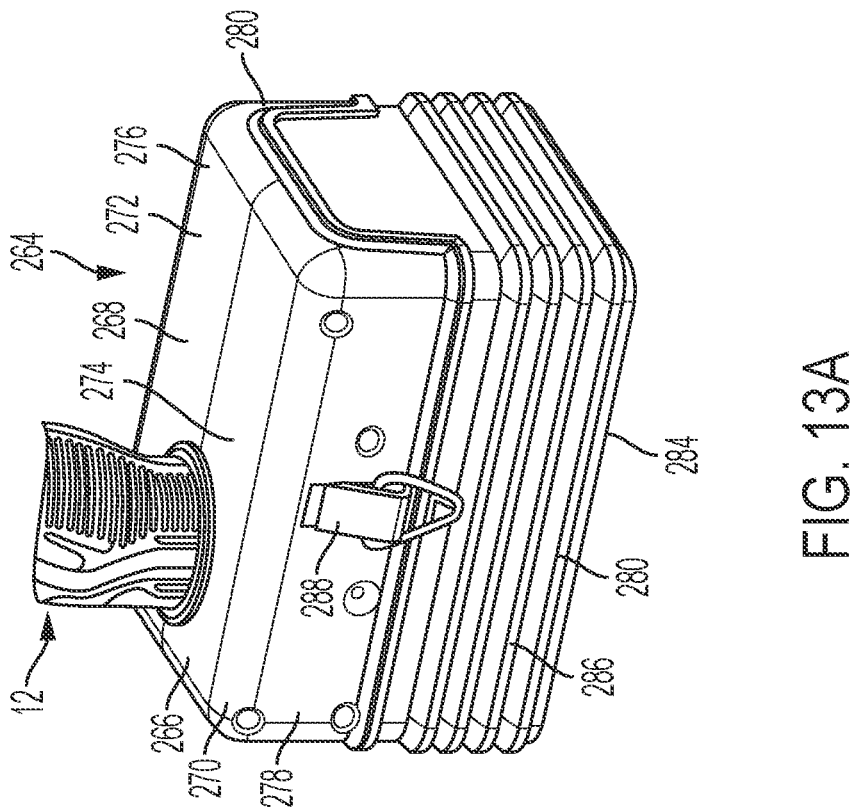

Referring to FIGS. 13A-13B, in another embodiment, an enclosure 264 is configured to be retrofittedely coupled to the battery pack receptacle 132 of the power tool 112 (or to power tools 12, 212a, 312a, 412a, 212b, 312b). The enclosure 264 comprises first and second enclosure members 266, 268 including a first clamshell member 270 and a second clamshell member 272. The clamshell members 270, 272 are configured to be retained around at least one of the top surface and the peripheral side surface of the battery pack receptacle 132. Each of the first and second clamshell members 270, 272 has a top wall portion 274, 276 configured to be received over at least one of the top surface 146 and a box-shaped sidewall portions 278, 280 that extend downward from the top wall portions 174, 176 over the peripheral side surface 148 of the battery pack receptacle 132 and over at least a portion of the battery housing 50 when the battery pack 14 is received in the battery pack receptacle 132. The clamshells 270, 272 may be snap fit together, but can be attached by fasteners such as screws to each other or to the battery pack receptacle. The enclosure 264 further includes a box shaped base 282 having a bottom wall portion 284 generally parallel to the top wall portions 274, 276 and an accordion-style sidewall portion 286 extending upward from the bottom wall portion 284. The accordion-style sidewall portion 286 is joined to the sidewall portions 278, 280 by one or more latches 288 that can be opened to allow access to an interior of the enclosure 264 to install or remove the battery pack 14 from the battery pack receptacle. The accordion-style sidewall portion 286 is adjustable in order to accommodate different sizes and configurations of battery packs.

Figure 14:
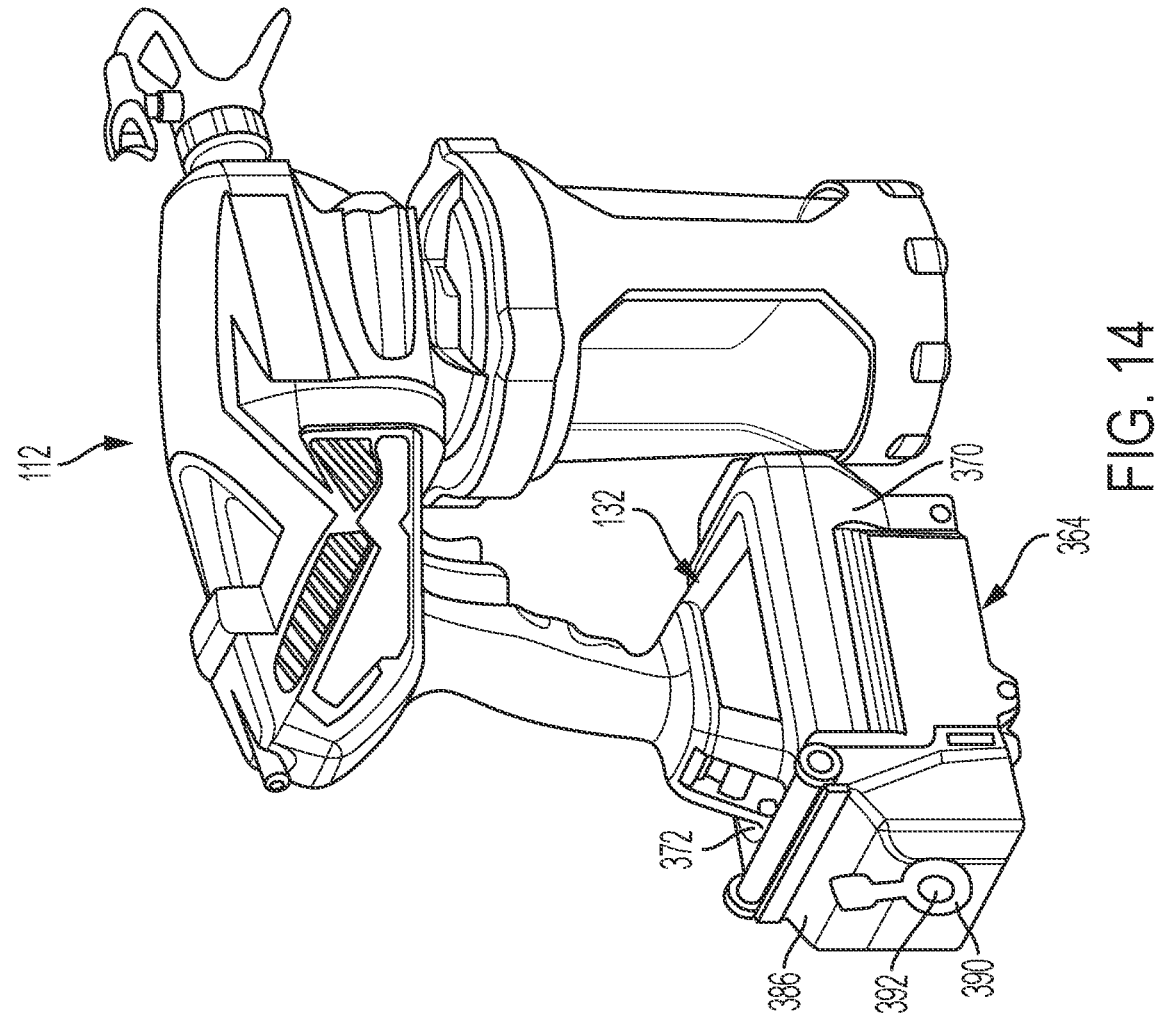
FIG. 14 is a perspective view of another embodiment of a battery pack enclosure retrofittedly coupled to one of the aforementioned power tools.
Figure 15:
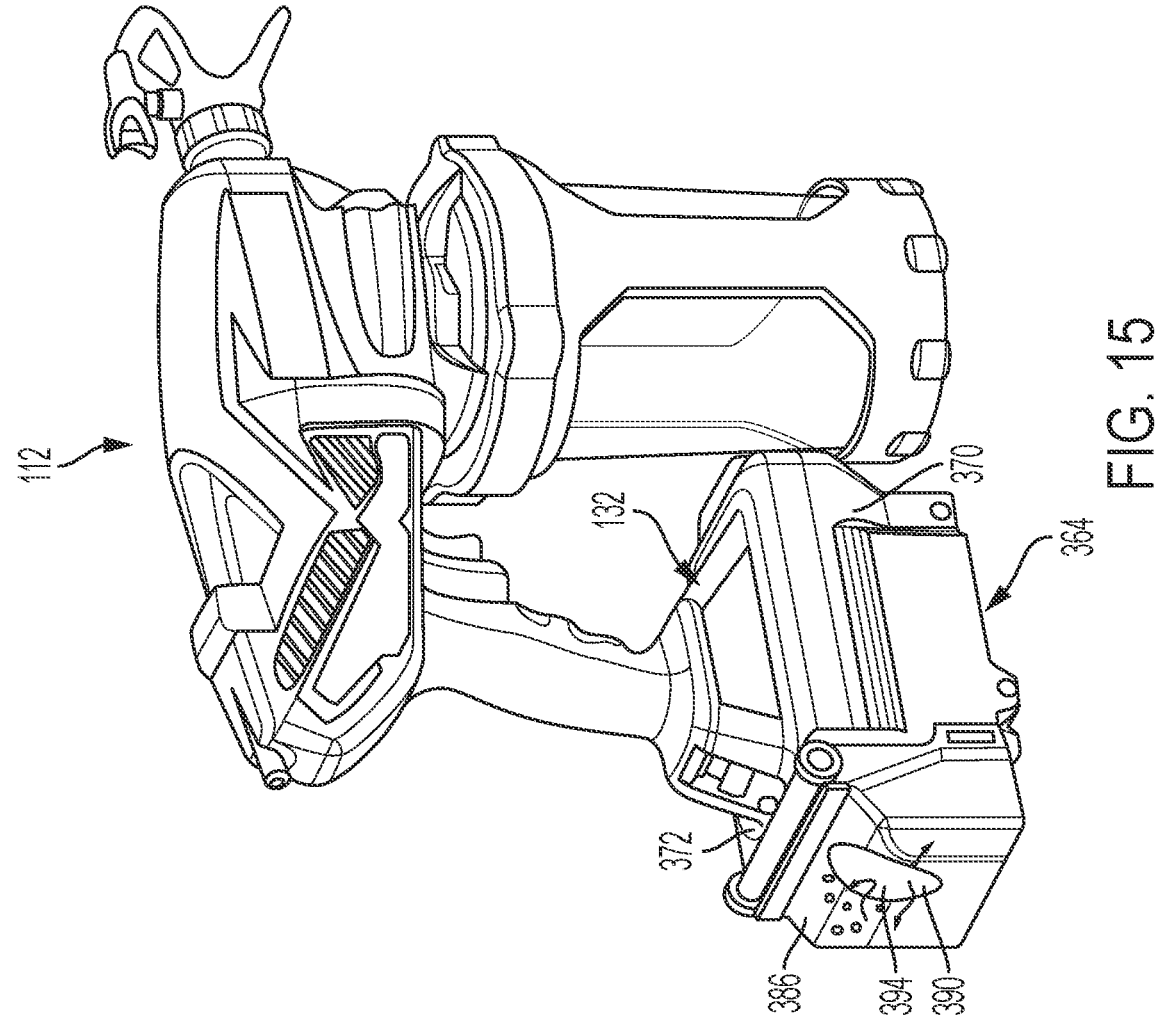
FIG. 15 is a perspective view of another embodiment of a battery pack enclosure retrofittedly coupled to one of the aforementioned power tools.

Referring to FIGS. 14-15, in another embodiment, an enclosure 364 is configured to be retrofittedely coupled to the battery pack receptacle 132 of the power tool 112 (or to the battery pack receptacles of one of the other power tools 12, 212a, 312a, 412a, 212b, 312b). The enclosure 364 is substantially similar to the enclosure 164 shown in FIGS. 6A-7, with the following differences. The enclosure 364 includes first and second clamshell members 370, 372 and a door 386 pivotably coupled to the first and second clamshell members 370, 372, substantially similar to the first and second clamshell members 170, 172 and door 186. The enclosure 364 additionally includes at least one pressure relief device 390 coupled to at least one of the clamshell members 370, 372 and the door 386. The pressure relief device 390 may include a valve 392 (as shown in FIG. 14), a pressure relief vent or member 394 (such as a GORE® PolyVent protective vent sold by W.L. Gore & Associates, Inc.) that enables ingress and egress of air while preventing ingress of moisture (as shown in FIG. 15), a blow-out valve, or a weak point in one of the walls. The pressure relief device 380 is configured to relieve outgas and relieve pressure inside the enclosure, e.g., due to battery pack heating during use. This may be desirable when the enclosure forms a water-tight or air-tight seal around the battery pack.

Figure 16:
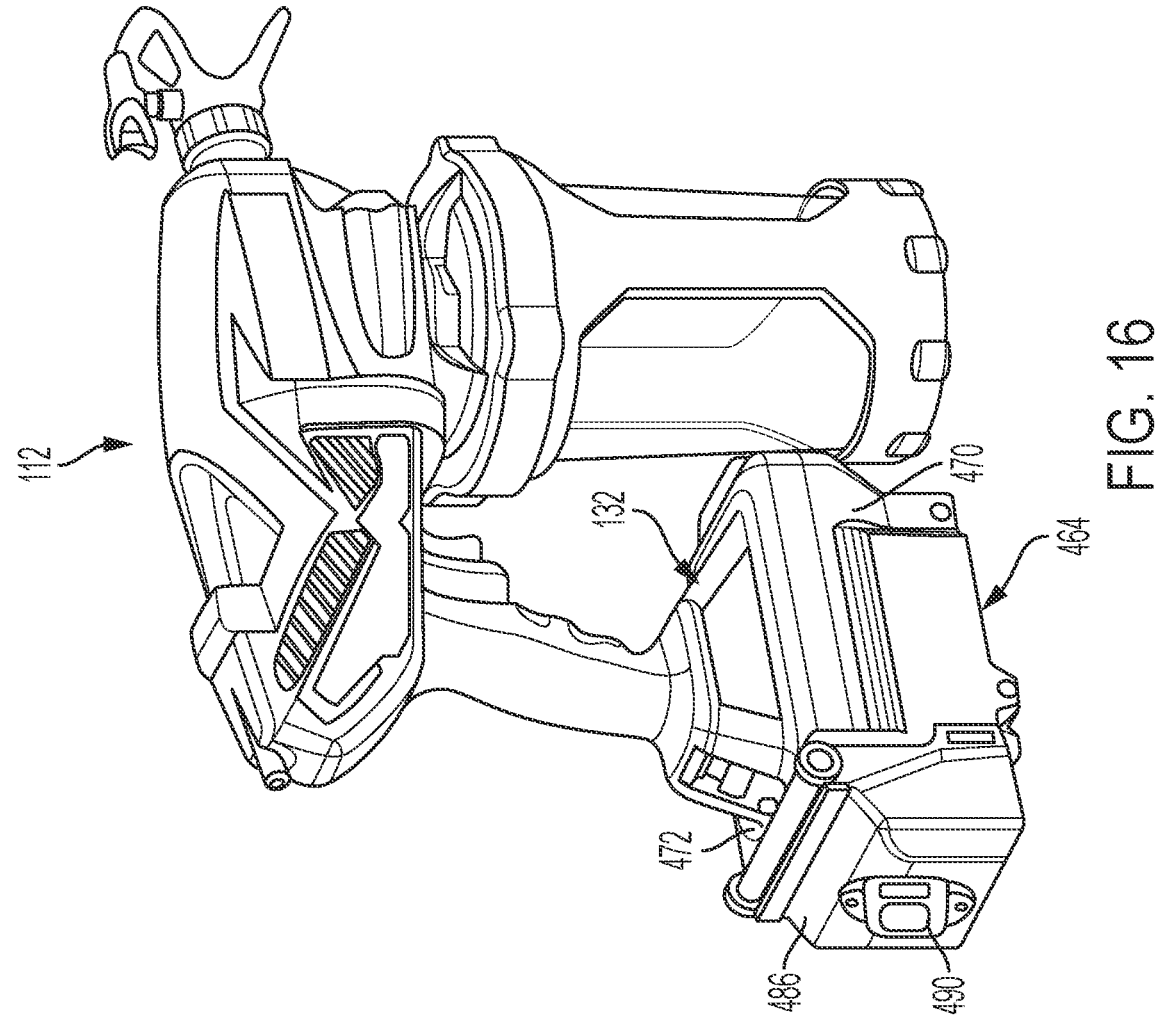
FIG. 16 is a perspective view of another embodiment of a battery pack enclosure retrofittedly coupled to one of the aforementioned power tools.

Referring to FIG. 16, in another embodiment, an enclosure 464 is configured to be retrofittedely coupled to the battery pack receptacle 132 of the power tool 112 (or to the battery pack receptacles of one of the other power tools 12, 212a, 312a, 412a, 212b, 312b). The enclosure 464 is substantially similar to the enclosure 164 shown in FIGS. 6A-7, with the following differences. The enclosure 464 includes first and second clamshell members 470, 472 and a door 486 pivotably coupled to the first and second clamshell members 470, 472, substantially similar to the first and second clamshell members 170, 172 and door 186. The enclosure 464 additionally includes a security tag or device 490 (or a mounting location for such a security tag or device) coupled to at least one of the clamshell members 470, 472 and the door 486. The security tag or device 390 (e.g., a RFID tag, an electro-magnetic tag, an acousto-magnetic tag, or a microwave tag). The security tag or device 390 may be used to track and/or prevent theft of the power tool, the enclosure, and or the battery pack.

Figure 17:
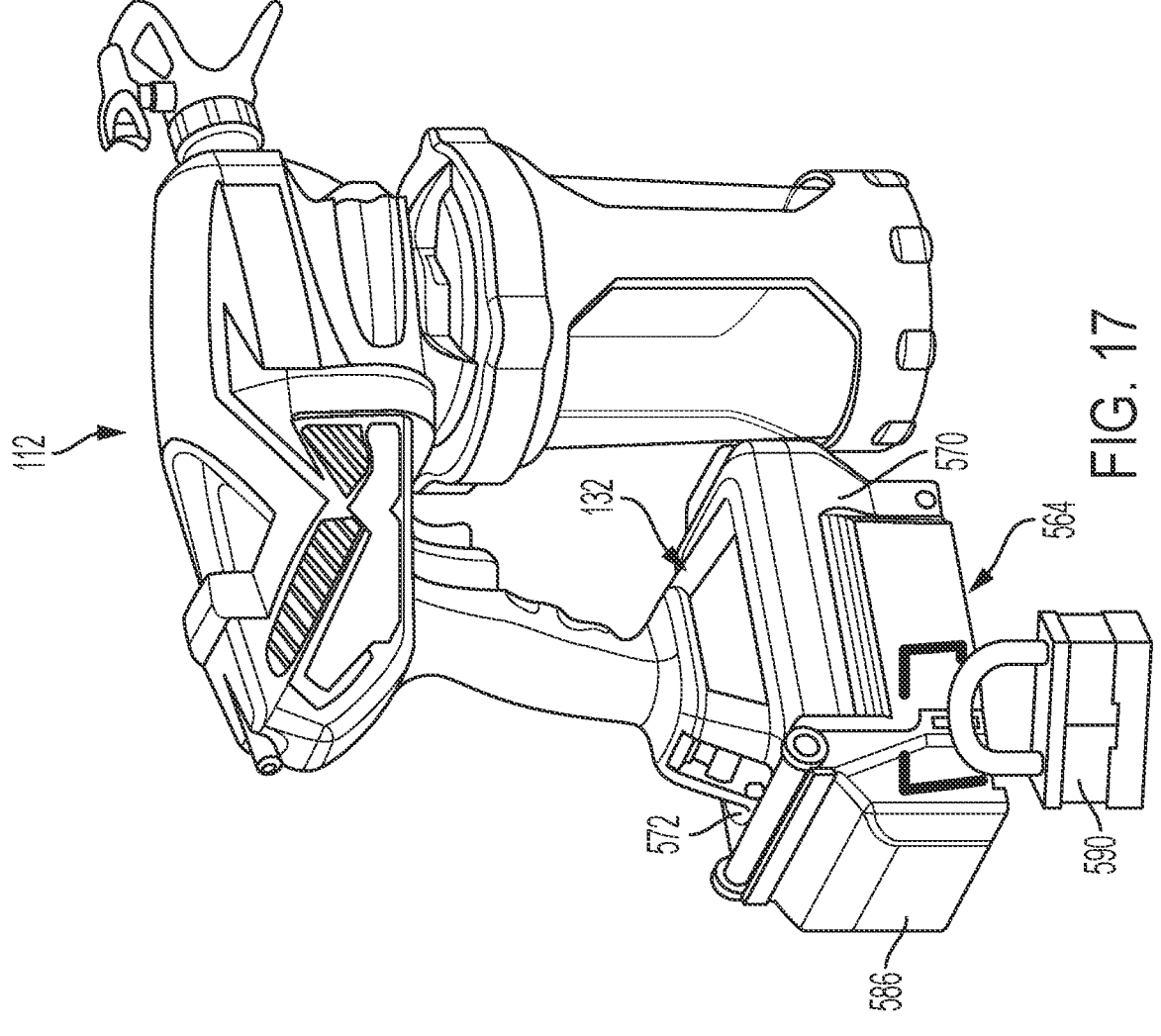
FIG. 17 is a perspective view of another embodiment of a battery pack enclosure retrofittedly coupled to one of the aforementioned power tools.

Referring to FIG. 17, in another embodiment, an enclosure 564 is configured to be retrofittedely coupled to the battery pack receptacle 132 of the power tool 112 (or to the battery pack receptacles of one of the other power tools 12, 212a, 312a, 412a, 212b, 312b). The enclosure 564 is substantially similar to the enclosure 164 shown in FIGS. 6A-7, with the following differences. The enclosure 564 includes first and second clamshell members 570, 572 and a door 586 pivotably coupled to the first and second clamshell members 570, 572, substantially similar to the first and second clamshell members 170, 172 and door 186. The enclosure 564 additionally includes a lock 590 coupled to the door 586 and to one or more of one of the clamshell members 570, 572. The lock 590 may be a mechanical lock (e.g., a padlock, a combination lock, or a key lock) or may be an electromechanical lock (e.g., an electromagnetic latch). The lock 590 may be used to prevent opening of the door 186 to prevent theft of the battery pack.

Figure 18:
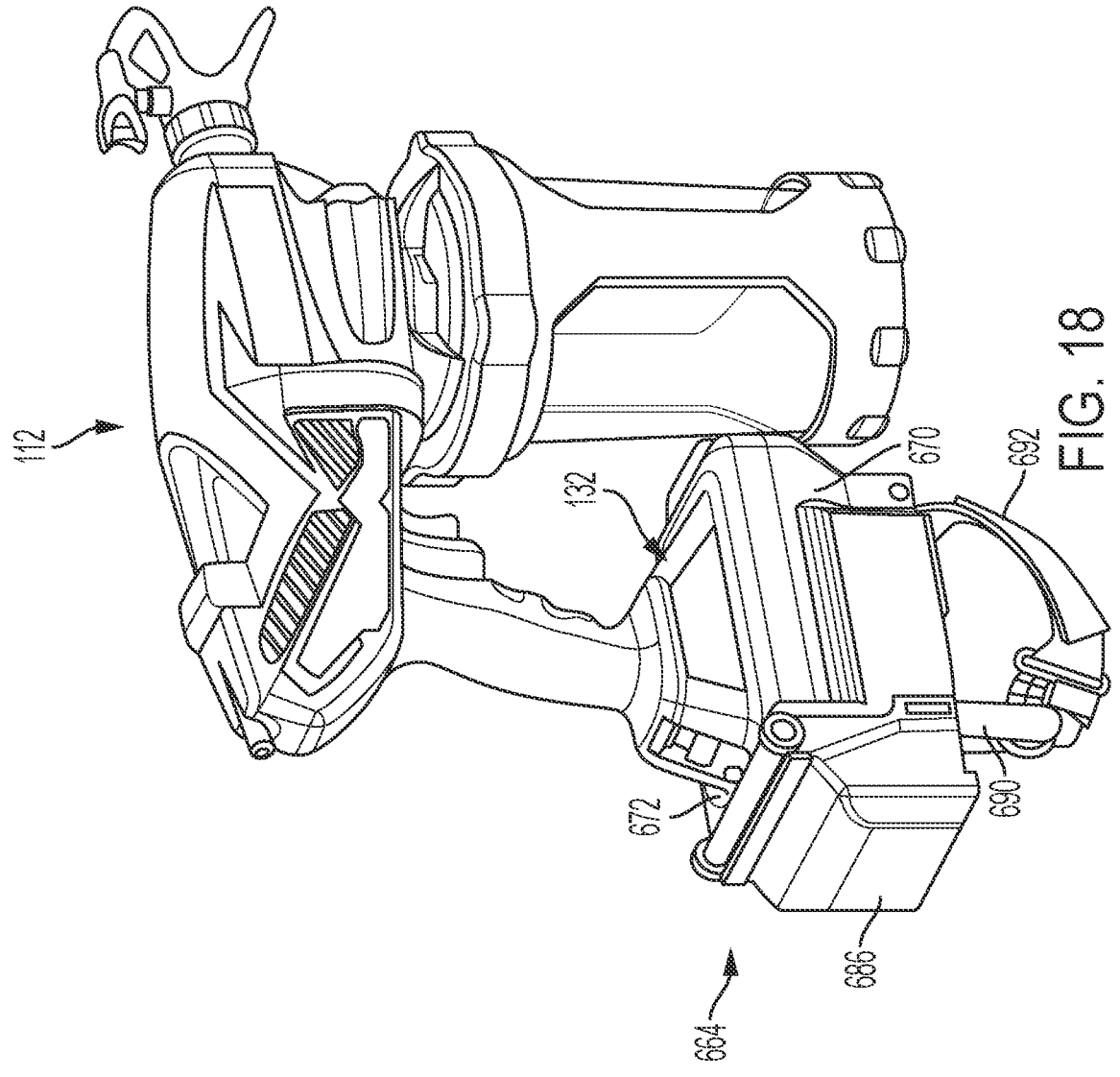
FIG. 18 is a perspective view of another embodiment of a battery pack enclosure retrofittedly coupled to one of the aforementioned power tools.

Referring to FIG. 18, in another embodiment, an enclosure 664 is configured to be retrofittedely coupled to the battery pack receptacle 132 of the power tool 112 (or to the battery pack receptacles of one of the other power tools 12, 212a, 312a, 412a, 212b, 312b). The enclosure 664 is substantially similar to the enclosure 164 shown in FIGS. 6A-7, with the following differences. The enclosure 664 includes first and second clamshell members 670, 672 and a door 686 pivotably coupled to the first and second clamshell members 670, 672, substantially similar to the first and second clamshell members 170, 172 and door 186. The enclosure 664 additionally includes a tethering attachment 690 coupled to one of the clamshell members 670, 672 and the door 686. The tethering attachment 690 is configured to receive a tethering strap 692 (e.g., a lanyard) that can be used to tether the enclosure 664 or the power tool 132 to a person or a stationary object to prevent the power tool from falling if it is dropped while working. Exemplary tethering attachments and tethering straps are described, e.g., in U.S. Pat. App. Pub. No. 2020/0194747, which is incorporated by reference.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A battery pack enclosure for a power tool comprising: first and second enclosure members configured to be non-movably coupled to each other to form an enclosure and to be retrofittedly coupled to a battery pack receptacle of a power tool by at least one of a snap-fit connection or at least one fastener, the battery pack receptacle configured to receive a battery pack that is removable, wherein the first and second enclosure members cover at least a portion of the battery pack receptacle and at least a portion of the battery pack when the battery pack is received in the battery pack receptacle to protect the battery pack from exposure to contaminants, allowing the battery pack to be removed from the battery pack receptacle while the enclosure remains coupled to the battery pack receptacle.

2. The battery pack enclosure of claim 1, wherein the first and second enclosure members include a first clamshell member and a second clamshell member configured to be coupled around at least a portion of an exterior surface of the battery pack receptacle.

3. The battery pack enclosure of claim 2, wherein each of the first clamshell member and the second clamshell member includes a top wall portion configured to be received over the exterior surface of the battery pack receptacle and a sidewall portion that extends downward from the top wall portion over at least a portion of the battery pack when the battery pack is received in the battery pack receptacle.

4. The battery pack enclosure of claim 3, wherein each of the first clamshell member and the second clamshell member further includes a bottom wall portion extending from the sidewall portion toward one another to at least partially cover a bottom surface of the battery pack when the battery pack is received in the battery pack receptacle.

5. The battery pack enclosure of claim 4, wherein the enclosure further comprises a door coupled to the first clamshell member and the second clamshell member, the door configured to be openable to removably insert the battery pack into the battery pack receptacle.

6. The battery pack enclosure of claim 1, wherein the first and second enclosure members are configured to receive a plurality of different battery pack sizes within the enclosure.

7. The battery pack enclosure of claim 6, further comprising at least one accordion-style wall portion coupled to the first and second enclosure members to facilitate user adjustment of a size of the enclosure.

8. The battery pack enclosure of claim 1, wherein the first and second enclosure members each include an elastomeric member configured to form a seal between the first and second enclosure members and the battery pack receptacle.

9. The battery pack enclosure of claim 1, wherein the at least one fastener includes at least one threaded fastener.

10. The battery pack enclosure of claim 1, wherein the enclosure is configured to be attachable to a plurality of other power tools each having a similarly configured battery pack receptacle.

11. A battery pack enclosure for a power tool comprising:
a top wall portion configured to be received over a top exterior surface of a battery pack receptacle of the power tool;
a sidewall portion that extends downward from the top wall portion over a side exterior surface of the battery pack receptacle;
a bottom wall portion that extends inward from the sidewall portion to at least partially cover a battery pack that is coupled to the battery pack receptacle; and
a door configured to be movably coupled to the sidewall portion and to be openable to removably couple the battery pack to the battery pack receptacle while the top wall portion, the sidewall portion, and the bottom wall portion remain fixed and non-movable relative to the battery pack receptacle, wherein, when the battery pack is coupled to the battery pack receptacle, the top wall portion, the sidewall portion, the bottom wall portion, and the door at least partially enclose the battery pack receptacle and the battery pack to protect the battery pack from exposure to contaminants.

12. The battery pack enclosure of claim 11, further comprising a first enclosure member that includes a first portion of the top wall portion and a second enclosure member that includes a second portion of the top wall portion.

13. The battery pack enclosure of claim 12, wherein the first enclosure member includes a first portion of the sidewall portion and the second enclosure member includes a second portion of the sidewall portion.

14. The battery pack enclosure of claim 12, wherein the first enclosure member includes a first clamshell member and the second enclosure member includes a second clamshell member, the first clamshell member and the second clamshell member configured to be coupled around the battery pack receptacle.

15. The battery pack enclosure of claim 12, wherein the first enclosure member and the second enclosure member are configured to be coupled to the battery pack receptacle by at least one of a snap-fit connection or a threaded fastener.

16. The battery pack enclosure of claim 11, wherein at least one of the top wall portion, the sidewall portion, the bottom wall portion, or the door include an elastomeric member configured to form a seal between the battery pack enclosure and the battery pack receptacle.

17. The battery pack enclosure of claim 11, wherein the battery pack enclosure is configured to be attachable to a plurality of other power tools each having a similarly configured battery pack receptacle.

18. The battery pack enclosure of claim 11, wherein the top wall portion, the sidewall portion, the bottom wall portion, and the door completely enclose the battery pack when the battery pack is inserted into the battery pack receptacle.

19. The battery pack enclosure of claim 11, wherein the battery pack enclosure is configured to receive a plurality of different battery pack sizes within the battery pack enclosure.

\* \* \* \* \*